Jan. 23, 1968  B. M. OSOJNAK  3,364,679

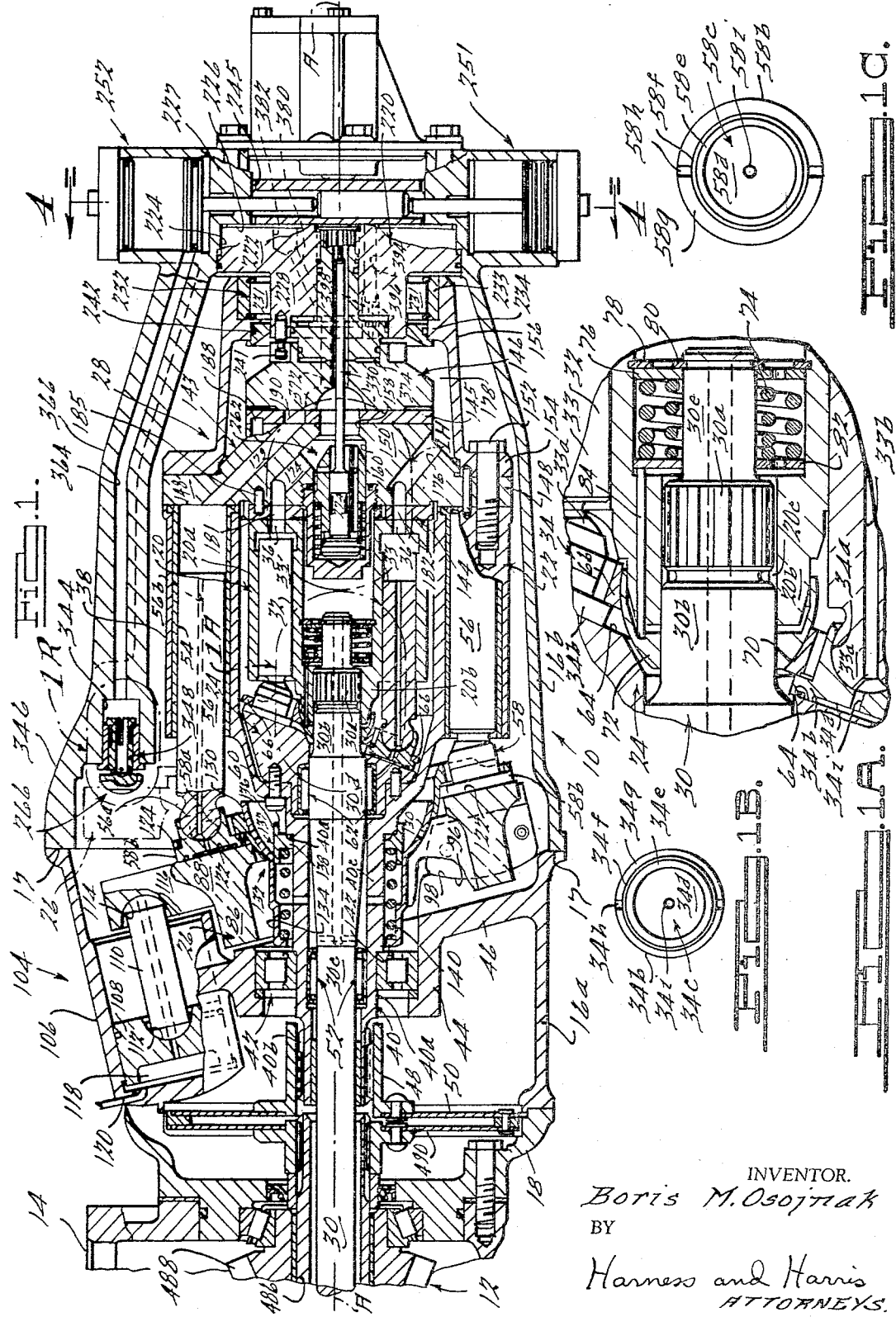

HYDROSTATIC TRANSMISSION

Filed Oct. 21, 1965   7 Sheets-Sheet 2

INVENTOR.
Boris M. Osojnak
BY
Harness and Harris
ATTORNEYS.

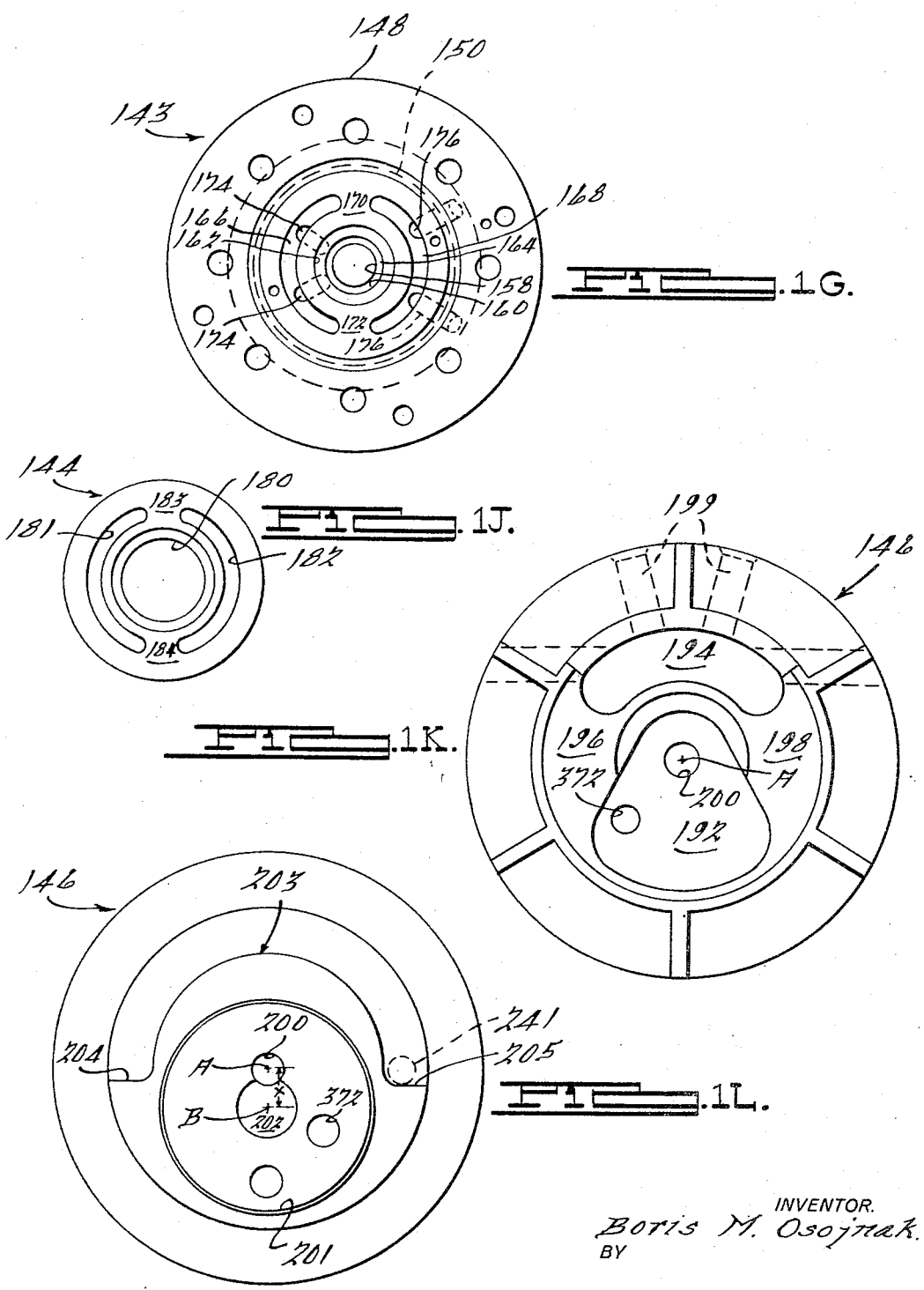

INVENTOR.
Boris M. Osojnak
BY
Harness and Harris
ATTORNEYS.

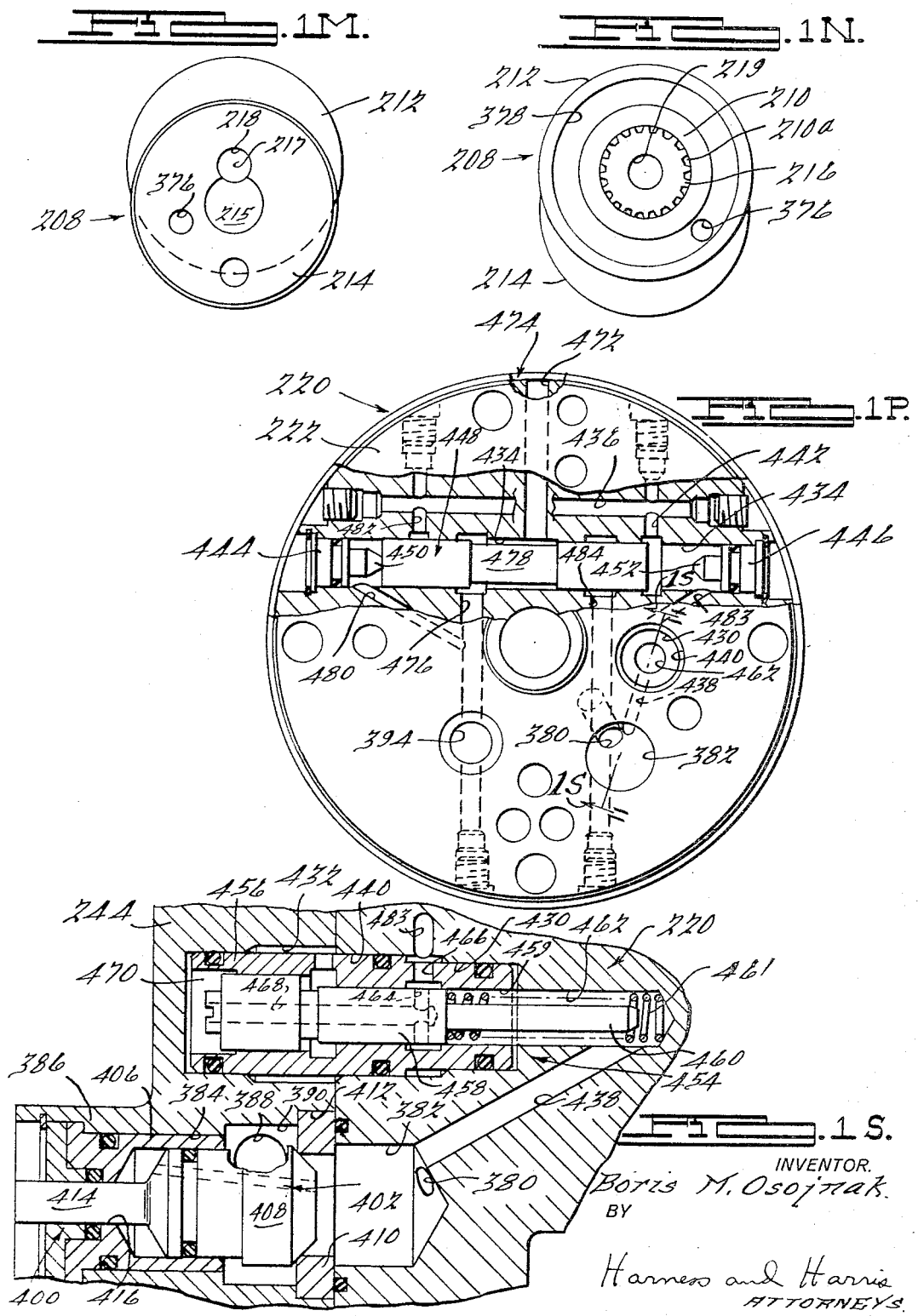

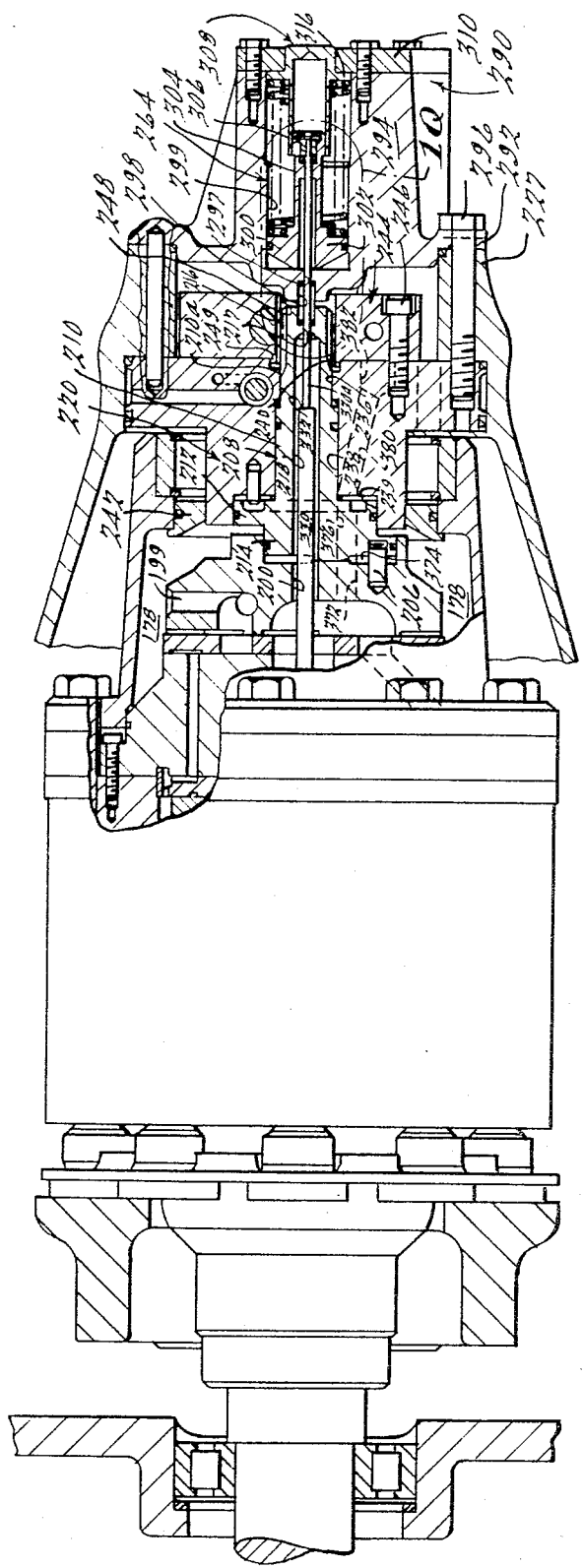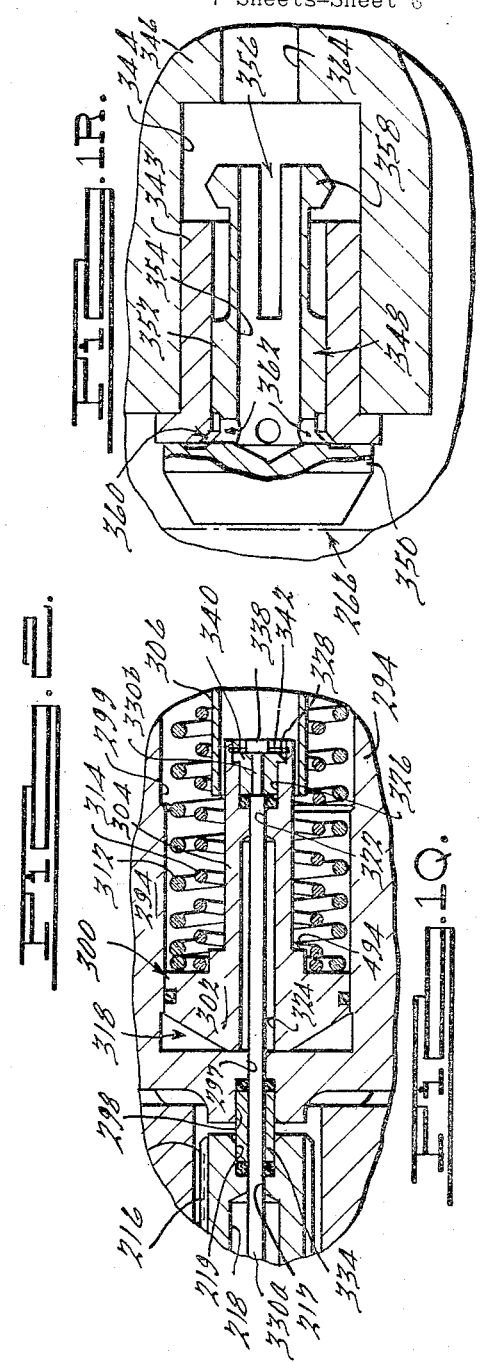

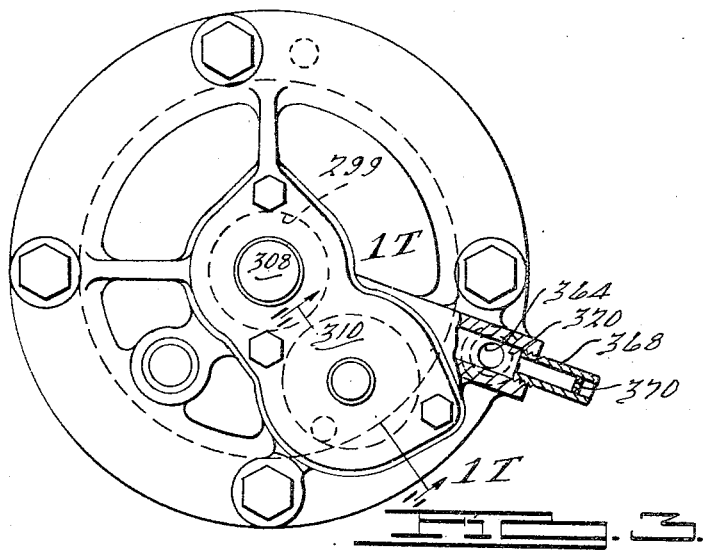
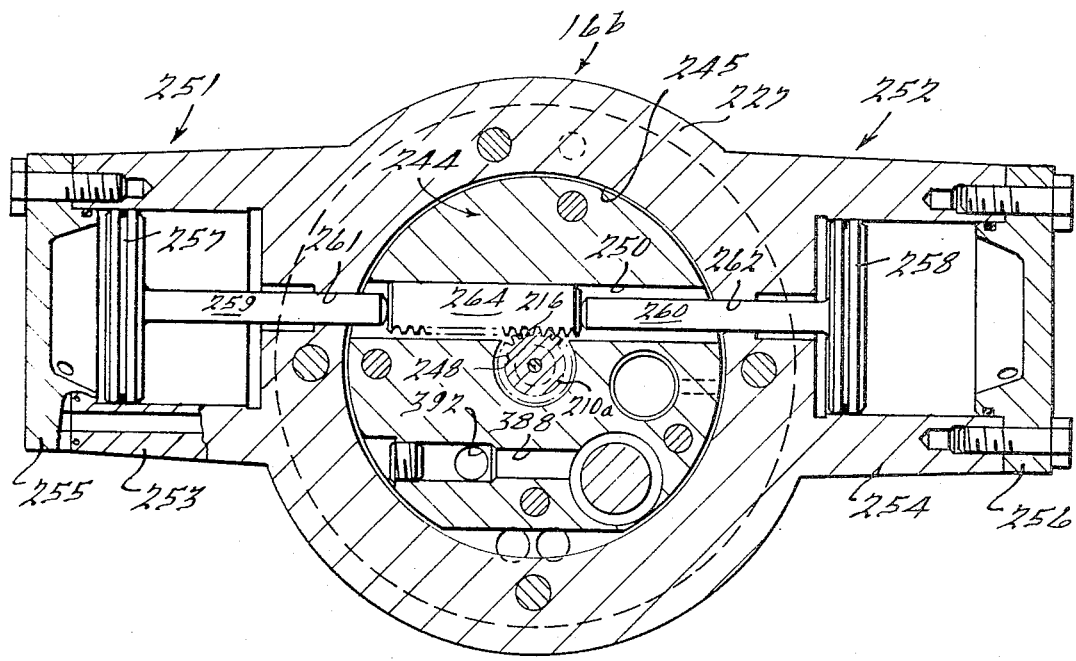

з,364,679
HYDROSTATIC TRANSMISSION
Boris M. Osojnak, Birmingham, Mich., assignor to Chrysler Corporation, Highland Park, Mich., a corporation of Delaware
Filed Oct. 21, 1965, Ser. No. 499,690
24 Claims. (Cl. 60—53)

ABSTRACT OF THE DISCLOSURE

A hydrostatic transmission of the split reaction type wherein fluid communication between the pump and the motor is blocked during direct drive conditions to isolate the motor from the high pressures generated in the pump.

---

This invention relates to hydrostatic apparatus. More particularly, it relates to a hydrostatic transmission for a motor vehicle.

It is an object of the present invention to provide an improved transmission of the hydrostatic type.

A more specific object is to provide a hydrostatic transmission especially suitable for automotive use.

Another object is to provide a hydrostatic transmission of efficient and simple design.

Yet another object is to provide a hydrostatic transmission which is quieter and more efficient than previous designs and which is accordingly better suited for automotive use.

In a typical hydrostatic transmission for automotive use, the automobile engine drives an input shaft which in turn drives a positive displacement pump; the pressure fluid output of the pump is used to drive a positive displacement motor which in turn drives the wheels of the automobile.

The transmission of the invention is of the "split reaction" type. That is, of the type in which the motor includes a first member journalled within the transmission casing and coupled directly to the output shaft and a second member carried by the casing, and the pump includes a first member coupled directly to the input shaft and a second member carried by the first member of the motor. With this arrangement, the torque applied to the output shaft is a combination or summation of a direct or mechanical torque transmitted directly to the motor via the second pump part and an indirect or fluid torque generated by the pressurized fluid from the pump acting in the motor.

As is typical, the motor of the transmission of the invention is of variable displacement and the variation of the displacement is accomplished by movement of the second motor part relative to the first motor part between a torque-multiplying position in which the displacement of the motor is at a maximum and a locked-up or one-to-one position in which the displacement of the motor is essentially zero.

According to an important feature of the present invention, as the second motor member moves into its locked-up or one-to-one position, fluid communication between the motor and pump is automatically blocked so that the motor is isolated from the high fluid pressures generated in the pump. Isolating the motor from the high fluid pressures of the pump has the desirable effect of substantially reducing the hammering noises and vibrations that have plagued previous hydrostatic transmissions of the split reaction type. It also has the desirable effect of increasing the efficiency of the transmission by eliminating the leakage or compressibility flow between the pump and the motor.

The present invention is particularly concerned with hydrostatic transmissions wherein the pump and motor are of the barrel and piston type.

Hydrostatic transmissions of this type in general comprise an input shaft associated with a pump or "primary" barrel and a motor or "secondary" barrel associated with an output shaft. Each barrel typically has a plurality of circumferentially spaced bores slidably receiving a like plurality of pistons. The primary pistons are arranged to bear against a "primary" reaction member which presents a cam or eccentric face to the primary pistons so that the latter are stroked in response to relative rotation of the primary reaction member and the primary barrel. The secondary pistons are arranged to bear against a "secondary" reaction member which also presents a cam or eccentric face to the secondary pistons so that the secondary barrel and secondary reaction member are caused to undergo relative rotation in response to stroking of the secondary pistons. Valving means are provided to selectively direct the pressurized fluid output of the primary or pump barrel to the individual pistons of the secondary or motor barrel so that the secondary barrel undergoes rotation relative to the secondary reaction member in response to relative rotation of the primary barrel and primary reaction member.

In the transmission of the invention, the input and output shafts are coupled directly to the primary and secondary barrels, respectively, and the primary reaction member is fixedly carried on the secondary barrel for rotation therewith so that the torque applied to the secondary barrel, and thereby to the output shaft is "split." That is, it is a combination or summation of a direct or mechanical torque generated by the direct reaction of the primary pistons against the primary reaction member and an indirect or fluid torque generated by the pressurized fluid from the primary barrel acting in the secondary cylinder bores to drive the secondary pistons against the secondary reaction member.

The secondary reaction member of the transmission of the invention is mounted for movement between a torque multiplying position in which the camming or eccentricity of the face against which the secondary pistons bear is at a maximum, whereby the working stroke of the primary pistons is at a maximum and a locked-up or one-to-one position in which the eccentricity of the reaction member face is eliminated, so that the secondary pistons remain substantially fixed relative to their bores as the secondary barrel rotates relative to the secondary reaction member.

In accordance with the "blocking" or "isolating" feature described above with reference to a hydrostatic transmission of generic or general form, as the secondary reaction member moves into its locked-up or one-to-one position, fluid communication between the primary and secondary barrel is automatically blocked so as to isolate the secondary barrel from the high fluid pressures generated in the primary barrel. As noted above, this has the effect of substantially reducing the hammering noises and vibrations that have characterized previous hydrostatic transmissions of the split reaction type and increasing the efficiency of the transmission by eliminating the leakage or compressibility flow between the primary and secondary barrels. The hydrostatic transmission of the invention is thus generally better suited for automotive use than previous units of this type.

These and other objects, features and advantages of the invention will be apparent from the following detailed description of a preferred embodiment of the invention, and from the accompanying drawings wherein:

FIG. 2 is a side view, in fragmentary cross-section, of the unit of FIG. 1;

FIG. 3 is a partially fragmentary view of the right end of the unit of FIGS. 1 and 2;

FIG. 4 is a cross-sectional view taken on line 4—4 of FIGS. 1 and 2.

*General description*

Figure 1D:
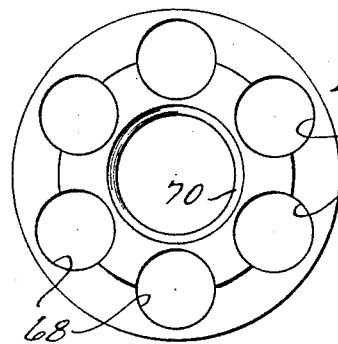
FIG. 1 is a top view, in cross-section, of a transaxle unit embodying a hydrostatic transmission according to the invention.
FIGS. 1A–1T are detail views of various parts of the unit of FIG. 1.

The description to follow is made with continual reference to FIGS. 1 and 2 and with specific reference, where indicated, to other detail figures. Unless otherwise indicated, the terms left and right as hereafter used refer to the orientation of FIGS. 1 and 2.

The hydrostatic transmission of the invention is shown in FIGS. 1 and 2 as part of a transaxle unit consisting of the hydrostatic transmission, seen generally at 10, and a differential, seen fragmentarily at 12.

Differential 12 includes a differential housing 14 and transmission 10 includes a transmission housing having a left portion 16a and a right portion 16b butted together at 17. Housing 14 is coupled to left housing portion 16a by an adaptor plate 18.

Transmission 10, broadly considered, comprises a primary barrel 20, a secondary barrel 22, a primary reaction member 24, a secondary reaction member 26, and valving means, seen generally at 28, for establishing selective fluid communication between primary barrel 20 and secondary barrel 22.

*Detailed description*

Primary barrel 20 includes a main body portion 20a, in the form of a cylindrical shell, and a hub portion 20b. Particular reference is now made to FIG. 1A, which is an enlarged view of the structure within circle 1A of FIG. 1. Hub portion 20b is provided with internal splines 20c which coact with an externally splined portion 30a of an input drive shaft 30. Barrel 20 is thus fixed to shaft 30 for rotation therewith. Shaft 30 also includes a pilot portion 30b which seats snugly within the left-hand unsplined portion of hub portion 20b and butts against the left ends of splines 20c.

The main body portion 20a of barrel 20 defines a plurality of circumferentially spaced, axially extending blind bores 32. A primary piston 33 is slidably received in each bore 32. Each primary piston 33 includes a ball end 33a swively received in a spherical socket 34a provided by a primary piston shoe 34.

Each shoe 34 also includes a circular base portion 34b presenting a bearing face 34c, best seen in FIG. 1B, a view of the left face of a shoe 34. Face 34c includes a depressed central surface 34d, a raised annular surface 34e rimming surface 34d, a depressed annular surface 34f rimming surface 34e, and a raised annular surface 34g rimming surface 34f. Radial drain grooves 34a extend through the outer peripheral wall of base portion 34b. A small bore 34i, best seen in FIG. 1A, extends through base portion 34b. Bore 34i opens at one end centrally of surface 34d and at its other end centrally of socket 34a. Bore 34i communicates with one end of a small bore 33b extending axially through piston 32. A cylinder port 36 extends axially from the bottom or blind end of each bore 32 through the adjacent wall of the primary barrel.

Secondary barrel 22 includes a main body portion 38, in the form of a cylindrical shell, and an elongated hub portion 40.

Secondary barrel 22 is rotatably mounted in transmission housing 16a, 16b for rotation about a central longitudinal axis A, by a roller bearing 42. Bearing 42 has its inner race press fitted on a journal section 40a of hub portion 40 and its outer race received in a central hub portion 44 of an integral partition 46 extending transversely of housing portion 16a. The free end section 40b of hub portion 40 is externally splined to key into the internally splined hub 48 of a flex plate 50.

Input shaft 30 passes coaxially through hub portion 40 of secondary barrel 22 and primary barrel 20 is disposed concentrically within the hollow main body portion 38 of secondary barrel 22. A needle bearing 52 within hub portion 40 rollably engages a journal portion 30c of shaft 30 to journal shaft 30 for rotation relative to secondary barrel 22 about central axis A.

A plurality of secondary bores 54 extend axially through main body portion 38 at circumferentially spaced locations therearound. A secondary piston 56 is slidably received in each bore 54. Each secondary piston includes a ball end 56a swively received in a spherical socket 58a provided by a secondary piston shoe 58.

Each shoe 58 also includes a circular base portion 58b presenting a bearing face 58c best seen in FIG. 1C, a view of the left face of a shoe 58. Face 58c includes a depressed central surface 58d, a raised annular surface 58e rimming surface 58d, a depressed annular surface 58f rimming surface 58e, and a raised annular surface 58g rimming surface 58f. Radial drain grooves 58h extend through the outer peripheral wall of base portion 58b. A small bore 58i extends through base portion 58b. Bore 58i opens at one end centrally of surface 58d and at its other end centrally of socket 58a. Bore 58i communicates with one end of a small bore 56b extending axially through piston 56.

Primary reaction member 24 is in the form of a swash plate and is positioned within main body portion 38 of the secondary barrel coaxial with shaft 30. Screws 60 passing through secondary barrel hub portion 40 fix member 24 against rotation relative to the secondary barrel. Member 24 has a central bore to pass shaft 30 and carries a needle bearing 62 which rollably engages a journal portion 30d of shaft 30 to assist bearing 52 in journaling shaft 30 in the secondary barrel. Member 24 presents a flat annular bearing surface 64 which is inclined relative to the axis of shaft 30 and extends around that axis to successively intersect the longitudinal axes of the successive primary bores 32.

A primary pressure plate 66 is provided to continuously urge piston shoes 34 against annular bearing surface 64. Reference is now made to FIG. 1D, which is a view of the right face of plate 66. Plate 66 is generally annular in form and includes a plurality of circumferentially spaced holes 68. Each hole 68 is of a diameter somewhat greater than that of the socket portion of a primary shoe 34 and somewhat less than that of the base portion of a primary shoe.

As best seen in FIG. 1A, the radially inner surface 70 of plate 66 is spherical and mounts plate 66 for swiveling movement on a ball joint member 72 carried on pilot portion 30b of input shaft 30. Ball joint member 72 is fixed against rotation on shaft portion 30b but is free to slide axially along that shaft portion. Ball joint member 72 is generally cup shaped and fits snugly over the free end of hub portion 20b of the primary barrel.

A double coil spring 74 is carried on the free or stub end portion 30e of the input shaft. Spring 74 bears at one end against a plate or disc 76 mounted on stud end shaft portion 30e. Disc 76 is held against axial movement toward the free end of shaft portion 30e by a snap ring 78 received in an internal groove in primary barrel 20. Another snap ring 80, provided for assembly purposes, is fitted into an external groove in stub end shaft portion 30e.

Spring 74 bears at its other end against a plate or disc 82 slidably mounted on stub end shaft portion 30e. Disc 82 in turn bears against one or more pins 84 which extend axially and slidably through the hub portion 20b of primary barrel 20 and are reecived at their other ends in sockets provided in the hub portion of ball joint member 72. Spring 74 thus acts to continuously urge ball joint member 72 axially along shaft portion 30b and ball joint member 72 in turn continuously presses pressure plate 66 against the base portions 34b of the several primary piston shoes 34 to maintain the bearing faces 34c of the latter in firm, flush contact with the annular bearing surface 64 presented by the primary reaction member 24.

Secondary reaction member 26 is in the form of a swash plate. Member 26 is best seen in FIG. 1E, which is a view of the left face of that member. Member 26 is generally annular and includes a base portion 86 and a flange portion 88 integral with base portion 86. Member 26 is mounted within housing 16a, in a position encircling hub 40 of secondary barrel 22, by a pair of bearing shoes 90 secured to lugs 92 as by screws 94. Lugs 92 are formed integral with the base and flange portions of reaction member 26. Shoes 90 present circular arcuate bearing surfaces 96 which coact with vertically spaced arcuate bearing surfaces 98 (only the lower or bottom one of which is seen in FIG. 1) provided by partition 46 to mount member 26 for pivotal movement about a vertical axis passing through the center of the circular arcs 96, 98. This pivotal axis of member 26 is preferably substantially tangential to the imaginary circle passing through the longitudinal axes of the secondary bores 54.

Member 26 is pivotally movable between the illustrated inclined or canted position and a position, seen in fragmentary phantom in FIG. 1, normal to axis A. This movement is accomplished by a cylinder and piston unit seen generally at 104. Unit 104 includes a cylinder 106 formed integral with housing portion 16a, a piston 108 slidable within cylinder 106, and a piston rod 110 received at one end in a socket 112 in piston 108 and at its other end in a socket 114 provided by a radial arm 116 formed integral with member 26. Upon admission of fluid under pressure to the sealed chamber 118 of cylinder 106, as for example through a passage 120 in cylinder 106, member 26 will be pivoted about its axis and moved gradually toward its phantom or normal position.

Flange portion 88 of reaction member 26 presents a flat annular bearing surface 122 which extends around axis A to successively intersect the longitudinal axes of the successive secondary bores 54. A secondary pressure plate 124 is provided to continuously urge secondary piston shoes 58 against annular bearing surface 122.

Figure 1F:
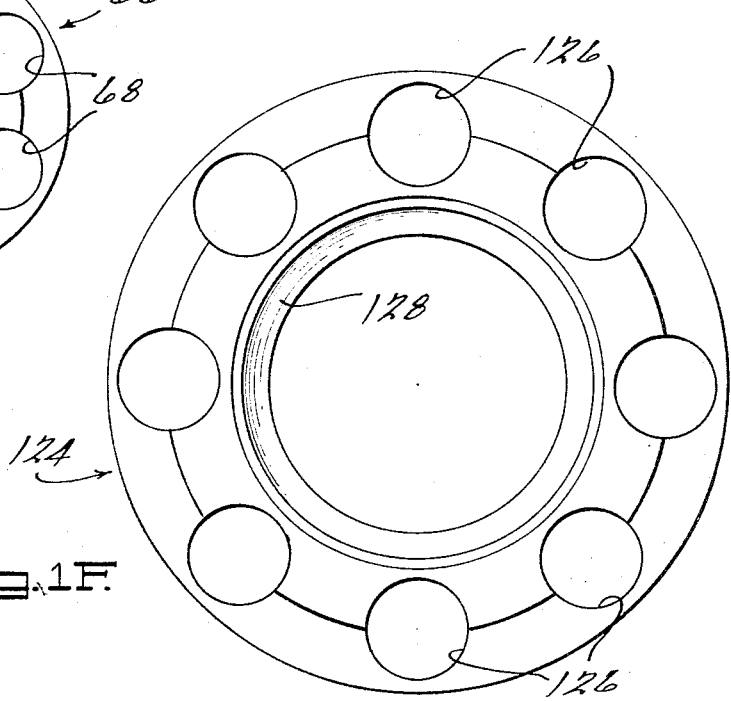
Figure 1E:
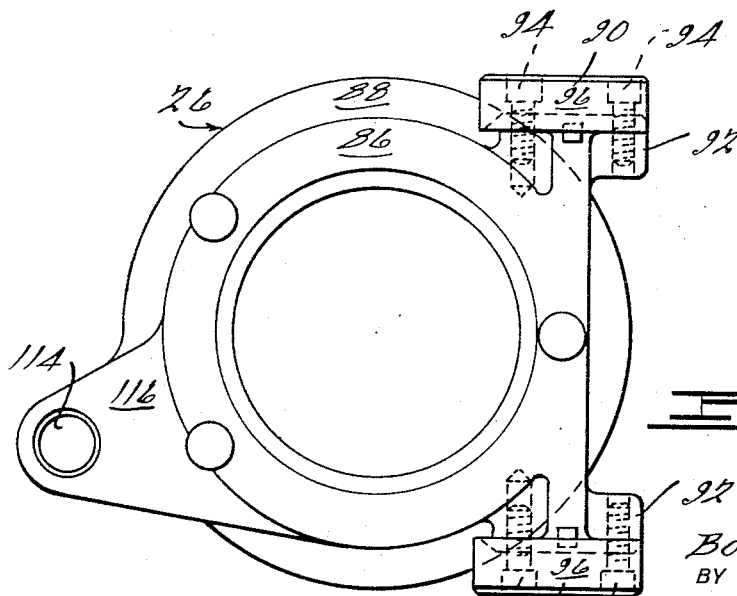

Plate 124 is best seen in FIG. 1F, which is a view of the right face of that plate. Plate 124 is generally annular in form and includes a plurality of circumferentially spaced holes 126. Each hole 126 is of a diameter somewhat greater than that of the socket portion 58a of a secondary shoe 58 and somewhat less than that of the base portion 58b of a secondary shoe. The radially inner surface 128 of plate 124 is spherical and mounts plate 124 for swivelling movement on the spherical bearing portion 130 of a ball joint member 132. Member 132 also includes a hub portion 134 slidably received over a cylindrical shell portion 136 of a spring adapter member 137. Member 137 also includes a central interior flange portion 138. Member 137 is fitted over section 40c of hub portion 40 to abut central flange portion 138 against an annular shoulder 40d at the right end of hub section 40c.

A compression spring 140 is carried on section 40c. Spring 140 bears at one end against central flange portion 138 and at its other end against a radial lip 142 formed as the inturned free end of hub portion 134 of ball joint member 132. Spring 140 thus acts to continuously urge ball joint member 132 axially along hub section 40c and ball joint member 132 in turn continuously presses pressure plate 124 against the base portions 58b of the several secondary shoes 58 to maintain the bearing faces 58c of the latter in firm, flush contact with the annular bearing surface 122 presented by the secondary reaction member 26.

Valving means 28 includes an unpressurizing housing 143, a primary port plate 144, a wear plate 145, and a secondary port plate 146.

Unpressurizing housing 143 is best seen in FIG. 1G, which is a view of the left face of that housing. Housing 143 includes a circular flange portion 148 and a central or hub portion 150. Flange portion 148 has an outside diameter equal to that of the main body portion 38 of secondary barrel 22. Housing 143 is secured to secondary barrel 22 by bolts 152 which pass through bores in the flange portion 154 of an inner housing 156 and through aligned bores in flange portion 148 for threaded engagement with secondary barrel 22. Unpressurizing housing 143 is thus clamped fixedly between secondary barrel 22 and inner housing 156.

Figure 1H:
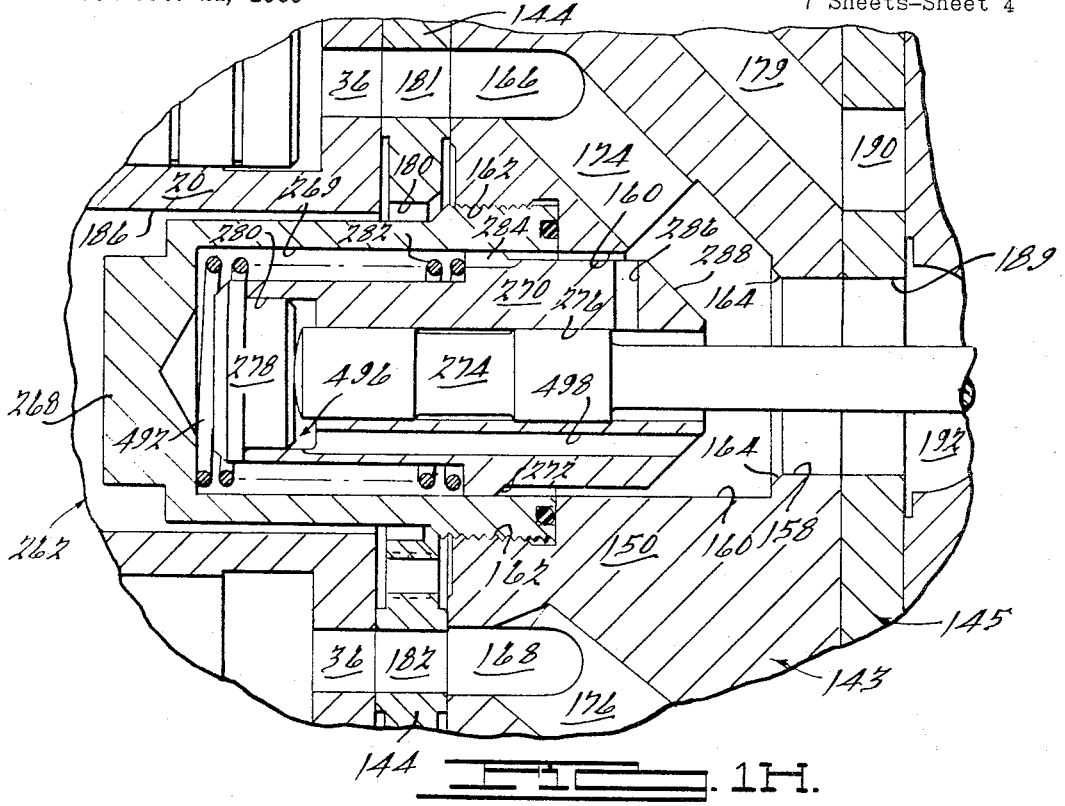
Figure 1T:
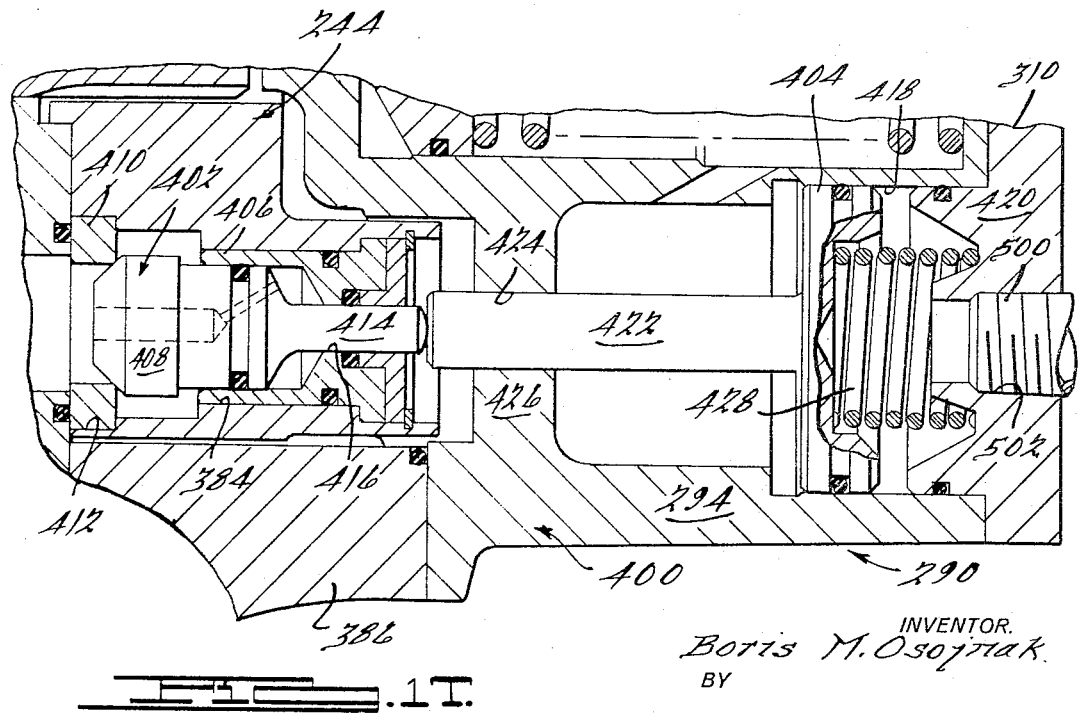

As best seen in FIG. 1H, which is an enlarged view of the structure within the circle 1H of FIG. 1, hub portion 150 of unpressurizing housing 143 has a central bore 158, a counterbore 160, and a further threaded counterbore 162. The shoulder between bore 158 and counterbore 160 is chamfered to provide a conical valve seat 164.

Referring again to FIG. 1G, hub portion 150 further includes a pair of kidneys or slots 166, 168 laid out on concentric circles centered on axis A and having a mean radius equal to the radius of the circle passing through the longitudinal axes of primary bores 32. Slots or kidneys 166, 168 are of equal effective length and are separated by diametrically opposed land portions 170, 172 each having a circumferential extent approximately equal to the diameter of a cylinder port 36. A plurality of diagonal bores 174 connect kidney 166 with counterbore 160 and a plurality of diagonal bores 176 connect kidney 168 with an annular space 178 defined between the outer peripheral surface of hub portion 150 and the adjacent inner peripheral surface of inner housing 156. A bore 179 extends from each secondary bore 54 and passes diagonally through hub portion 150 to open at the right-hand face of the latter. Bores 179 are spaced circumferentially around central bore 158.

Primary port plate 144 is best seen in FIG. 1J, which is an enlarged view of the left face of that plate. Plate 144 is disc-shaped and includes a central bore 180 and a pair of kidneys or slots 181, 182 separated by diametrically opposed land portions 183, 184. Plate 144 is fixedly secured, as by pins 185, to the left face of unpressurizing housing 143. When thus affixed, slots 181, 182 line up with and are circumferentially coextensive with slots 166, 168 and central bore 180 lines up radially with threaded counterbore 162 and the inner peripheral surface 186 of primary barrel 20 to form therewith a generally continuous central bore. Spring 74 acts through disc 76 and snap ring 78 to continuously press the right annular face of primary barrel 20 against the left face of primary port plate 144.

Wear plate 145 is disc shaped and is fixedly secured to the right face of unpressurizing housing 143 by pins 188. Plate 145 has a central bore 189 and a plurality of axial bores 190, corresponding in number to bore 179 in housing 143, which line up with the respective bores 179 to form axial extensions thereof.

Secondary port plate 146 is generally disc shaped. Wear plate 145 and port plate 146 are pressed together in firm face to face relation by spring 140 acting through adapter member 137. Plate 146 is not secured to wear plate 145, so as to allow relative rotation therebetween. The left and right faces of plate 146 are seen in FIGS. 1K and 1L, respectively. Port plate 146 includes a high pressure cavity 192 and a low pressure cavity 194, each opening at the left face of the plate. High pressure cavity 192 is of generally triangular configuration and includes central axis A. Low pressure cavity 194 comprises an arcuate slot or kidney curving around the radially inner apex of cavity 192. The radially outer edge of cavity 192 and the radially outer edge of cavity 194 are laid out on a circle centered on axis A, and having a radius approximately equal to that of an imaginary circle tangent to the outer edges of bores 190 in wear plate 145. Land portions 196, 198 separate each end of slot 194 from the adjacent edge of high pressure cavity 192. A plurality of diagonal holes 199 connect kidney or slot 194 with annular space 178.

Port plate 146 also includes a central bore 200 and a counterbore 201 opening at the right face of plate 146 and having a center B offset with respect to central axis A by a distance X. A raised flat circular face 202 is provided centrally of the blind end of the counterbore 201. The right face of plate 146 also has a semi circular peripheral cut out 203 terminating at its opposite ends in radial shoulders 204, 205. Port plate 146 is fixedly secured, as by pins 206, to a reversing member 208.

The left and right faces of reversing member 208 are seen in FIGS. 1M and 1N, respectively. Member 208 includes a shaft portion 210, a circular flange portion 212 concentric with shaft portion 210, and a circular flange portion 214. Flange portion 214 has a diameter substantially equal to that of counterbore 201 and a center offset with respect to shaft portion 210 and flange portion 212 by the distance X. A raised spherical face 215 is provided centrally of offset flange portion 214. Offset flange portion 214 of reversing member 208 is received within counterbore 201 of port plate 146 to abut raised flat face 202 against raised spherical face 215 and provide point contact therebetween at center B.

Shaft portion 210 of reversing member 208 is necked down at its approximate midpoint to provide a reduced diameter shaft portion 210a. A set of axial gear teeth 216 is cut into the free end of shaft portion 210a. Reversing member 208 has a central bore 217, a counterbore 218 opening at the left face of member 208, and a counterbore 219 opening at the right face of member 208. Counterbore 218 is coaxial with, and the same diameter as, central bore 200 in the secondary port plate so as to form an axial extension of that bore.

Reversing member 208, and thereby secondary port plate 146, are mounted for rotation about central axis A by a rear bearing support member 220. Member 220, the right face of which is seen in FIG. 1P, includes a flange portion 222. Portion 222 is received within an inner cylindrical face 224 of transmission housing portion 16b and seats against an annular face 226 presented by a thickened annular end portion 227 of housing portion 16b. Member 220 further includes a hub portion 228 defining a cylindrical bearing surface rotatably engaging the rollers 231 of a roller bearing 232. Bearing 232 includes an outer race 233 mounted within the free or righthand end of inner housing 156 against an inner peripheral rib 234 on housing 156. Bearing 232 thus assists bearing 42 in journaling the secondary barrel assembly for rotation within transmission housing 16a, 16b about central axis A.

Bearing member 220 has a central bore 236 coaxial with axis A, a lefthand counterbore 238, a further lefthand counterbore 239 opening at the left face of member 220, and a righthand counterbore 240 opening at the right face of member 220. Reversing member 208 is coaxially received within bearing member 220 with flange portion 212 of member 208 journaled in counterbore 239, shaft portion 210 journaled in counterbore 238 and shaft portion 210a journaled in central bore 236. A stop pin 241 projects from the left face of hub portion 228 for coaction with radial shoulders 204, 205 on secondary port plate 146.

A sealing ring 242 is fitted between hub portion 228 of bearing member 220 and the inner peripheral surface of rib 234 to define the righthand limit of annular space 178.

A disc shaped plate 244 is fitted concentrically within the circular opening 245 defined within the thickened annular end portion 227 of housing portion 16b. Plate 244 is secured by screws 246 to the right face of bearing member 220 with a central bore 248 in plate 244 fitting over the free, gear end of shaft portion 210a and a boss 249 piloting into counterbore 240 in bearing member 220. Plate 244 also includes a chordal bore 250, best seen in FIG. 4, intersecting the upper portion of central bore 248.

A pair of piston and cylinder units, indicated generally at 251, 252, are positioned at opposite sides of plate 244.

Each unit 251, 252 includes a cylindrical shell 253, 254 formed as an integral lateral extension of housing portion 16b, an end cap 255, 256 sealing the open outer end of shell 253, 254 and a piston 257, 258 sliding in shell 253, 254 and having a rod 259, 260 extending slidably through a lateral bore 261, 262 in thickened housing portion 227 and into chordal bore 250 in plate 244. A rack 264 of circular cross section is slidably disposed in chordal bore 250 between the free ends of piston rods 259, 260 with the teeth on the lower face of the rack meshing with the teeth 216 on the free end of the shaft portion 210a of reversing member 208.

The hydrostatic transmission of the invention also includes means for selectively blocking fluid communication between primary barrel 20 and secondary barrel 22. These blocking means include a valve assembly 262, a valve actuating assembly 264 controlling valve assembly 262, and a pressure control assembly 266 controlling the delivery of pressure fluid to the valve actuating assembly 264.

Valve assembly 262 is best seen in FIG. 1H. Assembly 262 includes a cap member 268 threaded into counterbore 162 in unpressurizing housing 143 to align the bore 269 of the cap member with counterbore 160, a generally cylindrical valve body 270 received within aligned bores 269 and 160 and having a flange portion 272 slidably engaging the ailgned bores to mount valve body 270 for reciprocal movement therein, and a valve spool 274 slidably received within a bore 276 extending axially through valve body 270. The free or lefthand end of spool 274 is spherical and bears against a plug 278 press fitted into a counterbore 280 in the left face of valve body 270. A coil spring 282 is fitted over the portion of valve body 270 to the left of flange portion 272 and is compressed between the blind end of bore 269 and the annular shoulder provided by the left face of flange portion 272. Axially extending notches 284 are provided at circumferentially spaced locations in flange portion 272 and a bore 286 extends radially through the portion of the valve body to the right of flange portion 272. Bore 286 opens in central bore 276 at a location which, in the position of FIG. 1, is immediately to the right of the right end of spool 274. The right face of valve body 270 is chamfered to provide a conical valve face 288 for sealing cooperation with conical valve seat 164 in a manner to be presently described.

Valve actuating assembly 264 is best seen in FIG. 2 and in FIG. 1Q which is an enlarged view of the structure within circle 1Q of FIG. 2. It includes an end cap member 290 having a flange portion 292 and a hub portion 294. Flange portion 292 is secured to the annular right-hand face of transmission housing 16b by bolts 296 passing through axial bores in thickened housing portion 227 and threading into bearing member 220. Bolts 296 thus rigidly secure both end cap member 290 and bearing member 220 to the transmission housing.

Hub portion 294 of end cap member 290 includes a central axial bore 297, a left-hand counterbore 298, and a right-hand counterbore 299. Counterbore 299 receives a piston 300. Piston 300 has a head portion 302 slidably engaging bore 299 and a stem portion 304 received slidably within the sleeve portion 306 of a plug 308. Plug 308 seats in a central aperture in an end plate 310 bolted to the right face of hub portion 294. A pair of concentrically arranged coil springs 312, 314 are positioned around piston stem portion 304 and plug sleeve portion 306. Springs 312, 314 are compressed between the right face of piston head portion 302 and a flange portion 316 on plug 308; springs 312, 314 thus continuously urge the left face of the head portion 302 of piston 300 against the blind end of counterbore 299. The left face of head portion 302 is chamfered to define an annular space 318 at the blind end of counterbore 299. A bore 320 (FIG. 3) extends obliquely through flange portion 292 and opens in annular space 318.

Piston 300 has a central bore 322, a left-hand counterbore 324, a right-hand counterbore 326 and a further right-hand counterbore 328.

A piston rod 330, formed as an integral axial extension of spool 274 of valve assembly 262, extends from spool 274 through bore 158 in unpressurizing housing 143, through bore 189 in wear plate 145, through cavity 192 and bore 200 in secondary port plate 146 and into counterbore 218 in reversing member 208 where it is necked down at 332 to form a reduced diameter portion 330a which extends through central bore 217, through a sleeve 334 received in aligned counterbores 219 and 298 in reversing member 208 and end member 290, respectively, through central bore 297 and through counterbore 324 and central bore 322 in piston 300 and into counterbore 326 where it is further necked down to a form reduced diameter portion 330b which swells to form a head end 338. Split keepers 340 are fitted over reduced diameter portion 330b and engage a snap ring 342 fitted into counterbore 328, whereby to secure piston rod 330 to piston 300.

Pressure control assembly 266 is best seen in FIG. 1 and in FIG. 1R which is an enlarged view of the structure within the circle 1R of FIG. 1. Assembly 266 includes a hollow sleeve 343 press fitted into a blind cylindrical bore 344 formed in a thickened portion 346 of transmission housing portion 16b, and an actuator or valve element in the form of a piston 348 slidably received in sleeve 343. Piston 348 includes a head portion 350 and a stem portion 352. Stem portion 352 has a central blind bore 354 and a plurality of axially extending slots 356. Slots 356 define a plurality of spring fingers 358 which yield radially inwardly to allow insertion of piston 348 into sleeve 343 and then snap out when clear of sleeve 343 to prevent removal of the piston from the sleeve. Head portion 350 is undercut to provide an annular groove 360 which extends axially into stem portion 352 where it communicates with central bore 354 through a plurality of radial passages 362. A passage or bore 364, provided in a rib 366 extending axially along the outer surface of housing portion 16b, opens at one end in bore 344 and at its other end in bore 320 (FIG. 3). A supply pipe 368 is threaded into flange portion 292 in alignment with bore 320. Pipe 368 includes a metering orifice plate 370.

The hydrostatic transmission of the invention also includes means for interconnecting or shortcircuiting the high pressure cavity 192 of secondary port plate 146 to the low pressure cavity 194. These interconnecting means include a through axial bore 372 (FIGS. 1, 2, 1J, 1N) in secondary port plate 146 opening at its left end in high pressure cavity 192 and at its right end in the space 374 (FIGS. 1, 2) between the adjacent faces of plate 146 and offset flange portion 214 of reversing member 208; an axial bore 376 (FIGS. 1, 2, 1L, 1M) in reversing member 208 in axial alignment with bore 372 and extending through flange portion 214 and thence through flange portion 212 to open in an annular groove 378 (FIG. 1N) in the right face of flange portion 212; a bore 380 (FIGS. 1, 2) opening at the left face of rear bearing support member 220 opposite the right end of bore 376 and extending obliquely through member 220 to open in a blind bore 382 (seen in FIG. 1 and in FIG. 1S, a fragmentary sectional view taken on line S—S of FIG. 1P) in the right face of that member; a bore 384 (seen in FIG. 1S and in FIG. 1T, a fragmentary sectional view taken on line T—T of FIG. 3) extending axially through an axially enlarged portion 386 of plate 244 in alignment with bore 382, a chordal bore 388 (FIGS. 4 and 1S) opening at one end in a diametrically enlarged portion 390 of bore 384 and extending laterally therefrom in plate member 244; a bore 392 (FIG. 4) extending axially into plate member 244 to intersect bore 388; a bore 394 (FIG. 1) extending axially into the right face of rear bearing support member 220 coaxial with bore 392; and a pair of axial bores 396 and 398 opening at one end in bore 394 and at the other end at the left face of hub portion 228 of rear bearing support member 220 in annular space 178. Since annular space 178 communicates with low pressure cavity 194 through passages 199, the described chain of interconnected bores provides communication between low pressure cavity 194 and high pressure cavity 192.

A valve assembly 400 (FIGS. 1S and 1T) is interposed in bore 384 to selectively open or block that bore and thereby selectively establish or block communication between high pressure cavity 192 and low pressure cavity 194.

Valve assembly 400 includes a poppet valve 402 and a piston 404. Poppet 402 is slidably received in a bushing 406 press fitted into bore 384. Poppet 402 includes a head portion 408, for coaction with a valve seat provided by a ring member 410 received in an enlarged portion 412 of bore 384, and a stem portion 414 slidably received in a central axial bore 416 in bushing 406. Piston 404 is slidably received in a bore 418 formed in the hub portion 294 of end member 290 in axial alignment with bore 384. Bore 418 is closed at its right end by a plug 420 formed integral with end plate 310. The rod 422 of piston 404 passes slidably through a central bore 424 formed in a partition 426 and is urged into end-to-end abutment with stem portion 414 of poppet spool 402 by a coil spring 428 compressed between plug 420 and piston 404.

Means are also provided to generate a high pressure signal for use in various control operations.

These means include a blind bore 430 (FIG. 1P and 1S) extending into the right face of rear bearing support member 220, a blind bore 432 extending into the left face of plate member 244 in axial alignment with bore 430, a chordal bore 434 extending horizontally through rear bearing support member 220, another chordal bore 436 in support member 220 parallel to end spaced above bore 434, an oblique bore 438 interconnecting bore 430 and bore 382, an oblique bore 483 connecting an enlarged portion 440 of bore 430 to chordal bore 434 adjacent one end of the latter, and a vertical bore 442 intersecting and interconnecting chordal bores 434 and 436.

Plugs 444 and 446 plug the opposite ends of chordal bore 434 and a valve spool 448 is mounted within chordal bore 434 for sliding movement between a first position, seen in FIG. 1P, abutting a stop button 450 on plug 444 and a second position abutting a stop button 452 on plug 446.

With spool 448 in its illustrated or first position, the interconnected bores 438, 430, 483, 434, 442, and 436, together with previously described bores 372, 376, 380, and 382, establish fluid communication between high pressure cavity 192 and bore 436 so that a pressure signal will be generated in bore 436. The magnitude of this signal is governed by a pressure regulating valve assembly 454 received in aligned bores 430 and 432.

Assembly 454, as seen in FIG. 1S, includes a bushing 456 fitted into aligned bores 430 and 432, and a valve spool 458 slidably received in a central bore 459 in bushing 456. Spool 458 includes a stem portion 460 guiding a coil spring 461 received within reduced diameter portion 462 of bore 430 and pressing against the right face of spool 458, a transverse passage 464 arranged to coact with a transverse passage 466 in the wall of bushing 456, and an axial passage 468 intersecting passage 464 and extending through spool 458 to open at the left face of the latter in a space 470.

Means are also provided to supply make-up fluid to annular space 178.

These make-up means include a central vertical bore 472 (FIG. 1P) in bearing support member 220 interconnecting a peripheral supply groove 474 in that member and chordal bore 434, and a vertical bore 476 interconnecting chordal bore 434 and axial bore 394. With spool 448 in its illustrated or first position, bores 472 and 476 communicate around the central valving portion 478 of spool 448 so that fluid communication is established between supply groove 474 and annular space 178 via bores 472, 434, 476, 394, and 396, 398. Thus, make-up fluid supplied to groove 474 will be delivered to space 178.

An oblique bore 480 extends between vertical bore 476 and the left end of chordal bore 434, and a vertical bore 482 interconnects chordal bore 436 and the left end of chordal bore 434. With valve spool 448 in its second position abutting stop button 452, bores 476, 480, 434, and 482, together with bores 394, and 396, 398, establish fluid communication between annular space 178 and chordal bore 436.

A vertical bore 484 interconnects chordal bore 434 and oblique bore 380. With spool valve 448 in its second position abutting stop button 380, bores 372, 376, 380, 484, 434, and 472 establish communication between high pressure cavity 192 and supply groove 474.

*Operation*

Upon rotation of input shaft 30, primary barrel 20 is rotated. As barrel 20 rotates, primary pistons 33 are reciprocated in their respective bores through alternate intake and compression strokes. Each stroke is of a fixed length determined by the angle of annular bearing surface 64 on primary swash plate 24.

As each primary piston moves through a suction or intake stroke, the cylinder port 36 of the primary bore slidably receiving that piston moves along and in communication with low pressure kidney 182 in primary port plate 144 and low pressure kidney 168 in unpressurizing house 143, whereby fluid is drawn from space 178, through bores 176, and through aligned kindneys 168 and 182 to fill the primary bore behind the retreating piston. As the piston reaches the end of its suction or intake stroke (this position is illustrated by the "lower" primary piston in FIG. 1), its cylinder port moves off of kidney 182 and onto land 184, whereby to trap the fluid which has filled in behind the piston. As the piston thereafter begins its working or compression stroke, its cylinder port moves into communication with the aligned high pressure kidneys 181 and 166 in primary port plate 144 and unpressurizing housing 143. The pressurized fluid is thus pushed out of the primary bore, through aligned kidneys 181 and 166 and through diagonal bores 174 and aligned central bores 158, 189 to high pressure cavity 192 in secondary port plate 146. The cylinder port remains in communication with kidneys 181 and 166 for the duration of the working stroke of the related piston, whereafter it moves onto land 183 and thereafter into communication with aligned low pressure kidneys 182 and 168 as the piston again begins an intake or suction stroke.

Rotation of primary barrel 20 thus results in the continuous delivery of pressurized fluid to high pressure cavity 192. From high pressure cavity 192, the pressurized fluid passes into the several bores 190 that are at any given instant in communication with cavity 192. From bores 190 the fluid passes through the corresponding diagonal bores 179 and into the corresponding secondary bores 54 where it exerts a working pressure against the corresponding secondary pistons 56. These pistons are thereby pushed outwardly and slide along the inclined face 122 of secondary swash plate 26 to produce rotation of the secondary barrel assembly and thereby rotate output shaft 486 and output pinion 488 through flex plates 50 and 490.

As each secondary piston reaches the end of its working or driving stroke, the corresponding bore 179 moves out of communication with cavity 192 and onto land 196 to trap the fluid in the piston. As the piston thereafter begins its exhaust stroke, the corresponding bore 179 moves into communication with low pressure cavity or kidney 194 in secondary port plate 146. The fluid is thus pushed out of the secondary bore and dumped into cavity 194 from where it moves through bores 199 into annular space 178 where it may again be sucked into a primary bore for recirculation in the described closed loop. Bore 179 remains in communication with kidney 194 for the duration of the exhaust stroke of the related piston, whereafter it moves onto land 198 and thereafter into communication with high pressure cavity 192 where it again receives pressurized fluid to move the piston through another driving or working stroke.

During operation of the transmission, bores 33b in primary pistons 33 coact with bores 34i in primary shoes 34 to conduct pressurized fluid from the related primary bores to the depressed areas 34d at the face of the shoes. Area 34d of a primary shoe is approximately equal to the cross sectional area of a primary piston so that the pressure acting against either end of the piston is substantially equal whereby to effect a balancing of the piston and reduce wear and friction between the shoes and the primary swash plate. In a similar manner, bores 56b in secondary pistons 56 coact with bores 58i in secondary shoes 58 to effect a balancing of the secondary pistons and reduce wear and friction between the secondary shoes and the secondary swash plate.

It will be noted that with each pumping stroke of a primary piston, a reaction force is transmitted back through that piston and applied against primary swash plate 24. This reaction force is absorbed by the primary swash plate and generates a torque tending to rotate the primary swash plate, and thereby the secondary assembly, in the same direction as the primary barrel. The secondary barrel assembly, and thereby the output shaft, are thus rotated by the combination of the torque generated by the direct or mechanical reaction of the primary pistons against the primary swash plate and the torque generated by the indirect action of the pressurized fluid acting in and driving the secondary pistons. The hydrostatic transimission of the invention is thus of the "split torque" or "split reaction" type.

The axial piston thrust or reaction generated by the secondary pistons appears in cavity 192 and is generally equal to the product of the effective area of cavity 192 and the pressure of the fluid in that cavity. However, fluid at this same pressure also acts continuously in cavity 374 so that the net force urging secondary port plate 146 to the right against reversing member 208 is proportional to the difference between the cross sectional area of cavity 374 and the net effective area cavity 192. This net force is carried at the point contact at center B between raised face 202 on secondary port plate 146 and raised spherical face 215 on reversing member 208. Center B is located substantially on the axial extension of the geometrical center of high pressure cavity 192 so that the mean vector representing the summation of all axial pressure forces generated within cavity 192 passes through the point contact between faces 202 and 215. The spherical shape of face 215 allows the secondary port plate to pivotally move on the reversing member to permit excellent sealing at the interface of the secondary port plate and the unpressurized housing.

When starting up, the secondary swash plate will normally be at its maximum inclination, thereby requiring a maximum volume of pressurized fluid to move each secondary piston through each stroke and thereby giving a maximum mechanical advantage or torque multiplication.

As the speed of the input shaft increases, the secondary swash plate is moved gradually toward its right angle position with respect to the transmission axis. As the inclination of the secondary swash plate decreases, the stroke of the secondary pistons decreases, thereby requiring a progressively smaller volume of fluid to move each secondary piston through each stroke and thereby progressively decreasing the torque multiplication.

The torque ratio of the transmission reaches one-to-one as the secondary swash plate reaches its right angle position with respect to the transmission axis. In this position, the secondary pistons have zero stroke and the primary and secondary barrels are hydraulically locked together and rotate as a unit. All of the torque is now being transmitted directly through the primary swash plate since the secondary pistons, because of their zero stroke, have zero torque output.

In this locked up, one-to-one condition, the bore 179 associated with each secondary bore 54 communicates alternately with low pressure cavity 194 and high pressure cavity 192 as the locked up primary and secondary barrels rotate as a unit relative to the stationary secondary port plate. The column of fluid trapped in each secondary bore behind the piston and in the associated diagonal bore 179 is thus subjected alternately to high and low pressures so that it is alternately, and in extremely rapid succession, being compressed and then allowed to expand. This "compressibility pumping" of the columns of trapped fluid in the secondary bores and associated diagonal bores 179 creates a loud and extremely objectionable hammering noise. This noise, together with the accompanying vibration, greatly reduces the attractiveness of hydrostatic transmissions of this type for automotive use. The alternate compression and expansion of the trapped columns of fluid also results in a small but significant leakage or compressibility flow between the primary and secondary barrels. This flow is generally equal to the product of the volume by which each individual column expands with each cycle, the number of secondary bores in the secondary barrel, and the instantaneous angular speed of the barrel. This leakage or compressibility flow results in rotation or slippage of the primary barrel relative to the primary swash plate with a resulting significant loss in overall transmission efficiency.

In the transmission of the present invention, the previously described blocking means 262, 264, 266 operate to substantially reduce this hammering noise and substantially eliminate this compressibility or leakage flow.

During operation of the transmission, fluid under nominal pressure is supplied continuously through bleed orifice 370 in pipe 368 to bores 320 and 364. This fluid fills bore 320 and annular space 318. It also fills bore 364 and bore 344 and, so long as secondary swash plate 26 remains in an inclined position, unseats piston or actuator 348 and allows fluid to continuously escape through radial bores 362 and annular groove 360. Thus the fluid pressure in annular space 318 is maintained at a level below that required to displace piston 300 against the resistance of springs 312 and 314. However, as secondary swash plate 26 reaches its upright or right angle position, it engages head portion 350 of piston or actuator 348 and seats that head portion firmly against sleeve 343, whereby to cut off escape of fluid through groove 360. Fluid pressure thereafter immediately builds up in annular space 318 to a value to overcome springs 312 and 314 and move piston 300 to the right.

As piston 300 moves to the right, piston rod 330 and valve spool 274 move with it. As spool 274 moves to the right, valve body 270 follows it under the urging of spring 282. Spring 282 is able to readily move valve body 270 to the right despite the high fluid pressure in bore 160 since the space 492 behind plug 278 is in fluid communication with bore 160 via notches 284 so that the fluid pressure force acting against conical valve face 288 is effectively counterbalanced by the fluid pressure force acting against the left face of plug 278. After a predetermined amount of rightward movement, conical valve face 288 seats against conical face 164 on unpressurizing housing 143.

At this instant, bore 160 is not yet blocked since there is still fluid pressure communication through radial bore 286 and axial bore 276. However, valve spool 274 continues to move to the right, sliding within valve body 270 to a position where it blocks radial bore 286 and thereby completely blocks bore 160. Spool 274 continues to move to the right until a shoulder 494 defined on piston head 302 moves into abutment with the free end of sleeve portion 306 of plug 308. The pressurized fluid acting against piston 300 is able to readily move spool 274 relative to valve body 270 despite the high fluid pressure in bore 153 since the space 496 behind the left end of spool 274 is in fluid communication with bore 153 through an axial bore 498 so that the fluid pressure force acting against the right end of spool 274 is effectively counterbalanced by the fluid pressure force acting in space 496 on the left end of the spool. Bore 498 also functions to allow pressure fluid to fill in behind spool 274 as the spool is moved to the right relative to valve body 270.

Valve body 270 now completely blocks fluid communication between primary barrel 20 and secondary barrel 22. The fluid in high pressure cavity 192 now quickly drops to a nominal pressure substantially equal to that of the fluid in discharge kidney 194. The columns of fluid trapped in the primary bores behind the pistons and in the associated diagonal bores thus undergo substantially no pressure change as they communicate alternately with "high pressure" cavity 192 and "low pressure" cavity 194. The "compressibility pumping" or "compressibility flow" that so seriously impaired the usefulness and practicality of previous hydrostatic transmissions of the split reaction type is thus largely eliminated in the transmission of the invention.

Isolating the secondary barrel and secondary port plate from the high pressures of the primary barrel also has the effect of reducing the force with which the secondary shoes are pressed against the secondary swash plate as well as the force with which unpressurizing housing 143 is pressed against the secondary port plate. The friction losses occurring between the rotating secondary shoes and the stationary secondary swash plate, and between the rotating unpressurizing housing and the stationary secondary port plate, are thus substantially reduced, thereby effecting a further improvement in the overall efficiency of the transmission in one-to-one ratio.

The pivotal mounting of the secondary swash plate on an axis generally tangent to the imaginary circle passing through the longitudinal axes of the secondary bores, rather than as previously on a pivotal axis passing through the central axis A of the transmission, also contributes to the quietness and smoothness of the transmission. That is, it was necessary with the prior, centrally pivoted swash plate to arrange the secondary pistons so that they would be substantially spaced from the blind end of the secondary bores with the secondary swash plate in vertical position so that the "bottom" pistons would have room to move further into their respective bores as the secondary swash plate was pivoted to its inclined, torque multiplying position. Since with the pivotal mounting of the present invention there is no axially inward movement of any secondary piston as the swash plate is moved from its vertical position to its inclined or torque multiplying position, the secondary pistons may be arranged so that they are substantially at the blind ends of their respective bores with the secondary swash plate in its vertical position.

The pivotal mounting of the invention thus substantially reduces the volume of dead or trapped fluid with the transmission in one-to-one or drive condition; this in turn reduces the amount of alternate compression and expansion that the trapped fluid undergoes and thereby further reduces the vibration, noise and slippage characteristic of prior transmissions of this type.

Valve body 270 is maintained firmly in its seated or blocking position by the pressure differential at its opposite ends. That is, since the fluid acting on its left end at plug 278 is at primary barrel pressure and the fluid acting at its right end on conical face 288 is at nominal secondary barrel pressure, there is a large net pressure force urging face 288 against face 164.

When the secondary swash plate moves away from its vertical position to again assume an inclined position, piston 348 is again unseated, whereupon the fluid pressure in cavity 318 acting on piston 300 drops to its former nominal value. Springs 312, 314 now urge piston 300 and piston rods 330 to the left to move valve spool 274 to the left within valve body 270 and thereby uncover radial port 286. As soon as radial port 286 is uncovered, the pressure acting on the opposite ends of the valve body 270 is equalized so that as valve spool 274 thereafter bottoms against plug 278, the valve body is readily moved by springs 312, 314 to its illustrated open position. The open positions of the valve body 270 and valve spool 274 are determined by abutment of piston head 302 against the blind end of bore 299.

The positioning of secondary swash plate 26 is controlled by modulation of a pressure signal tapped from the high pressure side of the transmission.

This signal is sensed in chordal bore 436 in rear bearing support 220. During drive conditions, the signal is tapped off of high pressure cavity 192 and transmitted to bore 436 via axial bore 372 in secondary port plate 146, axial bore 376 in reversing member 208, oblique bore 380 in rear bearing support 220, counterbore 382, oblique bore 438, oblique bore 483, chordal bore 434, and vertical bore 442. The pressure of the fluid maintains spool 448 in its left hand position against stop button 450 so as to provide communication via bore 434 between oblique bore 483 and vertical bore 442. Valve assembly 454 regulates the pressure of the sensed signal. Valve spool 458 moves to the left in response to fluid pressure in bores 462, 459 to establish communication between bore 459 and bore 438 through radial port 466. This also establishes communication between bore 459 and space 470 through radial bore 464 and axial bore 468 so that the pressure of the fluid in space 470 is equal to that of the fluid in bore 459. Valve assembly 454 thus functions to maintain an output pressure in bore 483 which bears generally the same ratio to the input pressure in bore 459 as the area of the right face of spool 458 bears to the area of the left face of that spool.

The pressure signal sensed in chordal bore 436 is fed to a control system, not shown, where, for example, it is modulated with a first pressure signal proportioned to engine speed and a second pressure signal proportional to accelerator depression; the resulting control signal is then supplied through port 120 to cylinder and piston unit 104 to selectively move piston 108 in cylinder 106 and selectively position the secondary swash plate.

During drive conditions, fluid under nominal pressure is continuously supplied to peripheral groove 474; this fluid is continuously delivered as make-up fluid to space 178 through vertical bore 472, chordal bore 434, vertical bore 476, axial bore 394, and axial bores 396, 398. The high pressure fluid in the right end of chordal bore 434 maintains valve spool 448 in its left-hand position so as to establish fluid communication between vertical bore 472 and vertical bore 476 around valving portion 478.

During braking, the high and low pressure sides of the transmission reverse so that annular space 178 is now at high pressure. The control pressure signal to be sensed in chordal bore 436 is now tapped off of annular space 178 and transmitted to bore 436 via axial bores 396, 398, axial bore 394, vertical bore 476, oblique bore 480, and vertical bore 482. Since the left end of chordal bore 434 is now in communication with the now high pressure in annular space 178 while the right end of bore 434 is in communication with the now low pressure in cavity 192, spool 448 is moved to its right-hand position in abutment with stop button 452, in which position it allows communication through chordal bore 434 between oblique bore 480 and vertical bore 482. Makeup fluid is now supplied to "high pressure" cavity 192 through vertical bore 472, around valving portion 478 of spool 448 to vertical bore 484, through vertical bore 484 to oblique bore 380, and thence through aligned axial bores 376 and 372.

Neutral position for the transmission of the invention is provided by control of valve assembly 400. During drive conditions, pressure fluid is supplied through a pipe 500 threaded into a central bore 502 in plug 310 to urge piston 404 to the left and maintain the head 408 of spool 402 in firm seating engagement with the valve seat on ring member 410. The force maintaining head 408 in seated or closed position is sufficient to resist opening displacement of that head by the high pressure fluid in counterbore 382. To place the transmission in neutral, the fluid pressure acting on piston 404 is released. The high pressure fluid in bore 382 now unseats head 408 against the resistance of spring 428 and thereby establishes fluid communication between bore 382 and chordal bore 388. A short circuit or bypass is now established between high pressure cavity 192 and annular space 178 via axial bores 372 and 376, oblique bore 380, bore 382, bore 390, chordal bore 388, axial bore 392, axial bore 394, and axial bores 396, 398. Fluid may now circulate freely in a closed, unpressurized loop extending from the output of the primary barrel to the reservoir and thence to the primary barrel input.

When it is again desired to place the transmission in drive condition, the magnitude of the fluid signal fed to piston 404 to reclose valve 400 is increased gradually to avoid lurching or grabbing of the transmission. For example, the control signal supplied to piston 404 may be modulated by a first control signal proportioned to the speed of the engine and a second control signal proportioned to the extent of accelerator depression.

Reverse position for the transmission is obtained by selective actuation of cylinder and piston units 251, 252.

In the forward drive positions, pressure fluid is supplied to unit 252 and exhausted from 251 so that rack 264 urges reversing member 208 and secondary port plate 146 in a counterclockwise direction, as viewed in FIG. 4, to press radial shoulder 205 on the secondary port plate against stop pin 241 on rear bearing support member 220. To place the transmission in reverse, pressure fluid is supplied to unit 252. This moves rack 264 to the right, as viewed in FIG. 4, and rotates reversing member 208 and secondary port plate 146 clockwise. This rotation is stopped after 180° of movement by abutment of stop pin 241 against the other radial shoulder 204.

With secondary port plate rotated 180° from its forward drive position, the direction of rotation of the secondary barrel is reversed. Note that whereas the net reaction torque in the forward positions is the sum of the torque generated directly against the primary swash plate and the torque generated indirectly by the pressurized fluid driving the secondary pistons, the net reaction torque in the reverse position is the difference between these two torques, since they are now acting in opposition to each other.

The hydrostatic transmission of the invention will be seen to provide an efficient, quiet and tractable unit which is peculiarly well adapted for automotive use.

Although a preferred embodiment of the invention has been illustrated and described in detail, it will be understood that various changes and modifications may be made in the disclosed embodiment without departing from the scope or spirit of the invention as defined in the appended claims. For example, whereas both the pump and motor of the disclosed embodiment are of the barrel and piston type, it will be apparent that at least some of the more important features of the invention may be effectively employed in a unit wherein the pump and/or motor is of a different form such, for example, as a vane, gear, or screw unit.

I claim:
1. A hydrostatic transmission of the split reaction type including:
 (A) a casing;
 (B) an input shaft;
 (C) an output shaft;
 (D) positive displacement pump means;
 (E) a positive displacement motor including
  (1) a first motor member journalled for rotation within said casing and drivingly connected to said output shaft, and
  (2) a second motor member carried by said casing;
 (F) valving means, including low pressure conduit means and high pressure conduit means, operative to establish fluid communication
  (1) through said low pressure conduit means between the intake of said pump means and a source of low pressure fluid and
  (2) through said high pressure conduit means between the output of said pump means and said motor;
 (G) said pump means
  (1) including (a) a first pump member fixed to said input shaft for rotation therewith and (b) a second pump member mounted for rotation with said first motor member and
  (2) being operative in response to relative rotation of said first and second pump members to (a) draw low pressure fluid through said low pressure conduit means and (b) deliver high pressure fluid through said high pressure conduit means to the intake of said motor, whereby to drive the latter;
 (H) means mounting one of said motor members for movement relative to said casing and said other motor member between
  (1) a torque multiplying position in which the displacement of said motor is at a maximum value and
  (2) a locked-up position in which the displacement of said motor is substantially zero; and
 (I) means operative to selectively block said high pressure conduit means and isolate the motor from the high pressures generated in the pump means.

2. A hydrostatic transmission of the split reaction type including:
 (A) a casing;
 (B) an input shaft;
 (C) an output shaft;
 (D) positive displacement pump means;
 (E) a positive displacement motor including
  (1) a first motor member journalled for rotation within said casing and drivingly connected to said output shaft, and
  (2) a second motor member carried by said casing;
 (F) valving means, including low pressure conduit means and high pressure conduit means, operative to establish fluid communication
  (1) through said low pressure conduit means between the intake of said pump means and a source of low pressure fluid and
  (2) through said high pressure conduit means between the output of said pump means and said motor;
 (G) said pump means
  (1) including (a) a first pump member fixed to said input shaft for rotation therewith and (b) a second pump member carried by said first motor member for rotation therewith and
  (2) being operative in response to relative rotation of said first and second pump members to (a) draw low pressure fluid through said low pressure conduit means and (b) deliver high pressure fluid through said high pressure conduit means to the intake of said motor, whereby to drive the latter;
 (H) means mounting said second motor member for movement relative to said casing and said first motor member between
  (1) a torque multiplying position in which the displacement of said motor is at a maximum value and
  (2) a locked-up position in which the displacement of said motor is substantially zero; and
 (I) means operative in response to movement of said second motor member into its locked-up position to block said high pressure conduit means and thereby isolate the motor from the high pressures generated in the pump means.

3. A hydrostatic transmission of the split reaction type including:
 (A) a casing;
 (B) an input shaft;
 (C) an output shaft;
 (D) positive displacement pump means;
 (E) a positive displacement motor including
  (1) a first motor member journalled for rotation within said casing and drivingly connected to said output shaft, and
  (2) a second motor member carried by said casing;
 (F) valving means, including low pressure conduit means and high pressure conduit means, operative to establish fluid communication
  (1) through said low pressure conduit means between the intake of said pump means and a source of low pressure fluid and
  (2) through said high pressure conduit means between the output of said pump means and said motor;
 (G) said pump means
  (1) including (a) a first pump member fixed to said input shaft for rotation therewith and (b) a second pump member carried by said first motor member for rotation therewith and
  (2) being operative in response to relative rotation of said first and second pump members to (a) draw low pressure fluid through said low pressure conduit means and (b) deliver high pressure fluid through said high pressure conduit means to the intake of said motor, whereby to drive the latter;
 (H) means mounting said second motor member for movement relative to said casing and said first motor member between
  (1) a torque multiplying position in which the displacement of said motor is at a maximum value and
  (2) a locked-up position in which the displacement of said motor is substantially zero; and
 (I) a valve member mounted for movement between
  (1) a first position hydraulically blocking said high pressure conduit means and
  (2) a second position clear of said high pressure conduit means; and
 (J) means operative
  (1) in response to movement of said first motor member into its locked-up position to move said valve member to said first position and
  (2) in response to movement of said first motor member out of said locked-up position to move said valve member to said second position.

4. A hydrostatic transmission of the split reaction type including:
 (A) a casing;
 (B) an input shaft;
 (C) an output shaft;

(D) positive displacement pump means;
(E) a positive displacement motor including
(1) a first motor member journalled for rotation within said casing and drivingly connected to said output shaft, and
(2) a second motor member carried by said casing;
(F) valving means, including low pressure conduit means and high pressure conduit means, operative to establish fluid communication
(1) through said low pressure conduit means between the intake of said pump means and a source of low pressure fluid and
(2) through said high pressure conduit means between the output of said pump means and said motor;
(G) said pump means
(1) including (a) a first pump member fixed to said input shaft for rotation therewith and (b) a second pump member carried by said first motor member for rotation therewith and
(2) being operative in response to relative rotation of said first and second pump members to (a) draw low pressure fluid through said low pressure conduit means and (b) deliver high pressure fluid through said high pressure conduit means to the intake of said motor, whereby to drive the latter;
(H) means mounting said second motor member for movement relative to said casing and said first motor member between
(1) a torque multiplying position in which the displacement of said motor is at a maximum value and
(2) a locked-up position in which the displacement of said motor is substantially zero; and
(I) a source of control fluid;
(J) a valve member movable
(1) in response to a predetermined control fluid pressure, into a first position hydraulically blocking said high pressure conduit means and
(2) in response to a control fluid pressure below said predetermined value, into a second position clear of said high pressure conduit; and
(K) means operative
(1) in response to movement of said first motor member into its locked-up position to raise said control fluid pressure to said predetermined value and
(2) in response to movement of said first motor member out of said locked-up position to lower said control fluid pressure below said predetermined value.

5. A hydrostatic transmission of the split reaction type including:
(A) a casing;
(B) an input shaft;
(C) an output shaft;
(D) positive displacement pump means;
(E) a positive displacement motor including
(1) a first motor member journalled for rotation within said casing and drivingly connected to said output shaft, and
(2) a second motor member carried by said casing;
(F) valving means, including low pressure conduit means and high pressure conduit means, operative to establish fluid communication
(1) through said low pressure conduit means between the intake of said pump means and a source of low pressure fluid and
(2) through said high pressure conduit means between the output of said pump means and said motor;
(G) said pump means
(1) including (a) a first pump member fixed to said input shaft for rotation therewith and (b) a second pump member carried by said first motor member for rotation therewith and
(2) being operative in response to relative rotation of said first and second pump members to (a) draw low pressure fluid through said low pressure conduit means and (b) deliver high pressure fluid through said high pressure conduit means to the intake of said motor, whereby to drive the latter;
(H) means mounting said second motor member for movement relative to said casing and said first motor member between
(1) a torque multiplying position in which the displacement of said motor is at a maximum value and
(2) a locked-up position in which the displacement of said motor is substantially zero; and
(I) a valve member mounted for movement between
(1) a first position hydraulically blocking said high pressure conduit means and
(2) a second position clear of said high pressure conduit means;
(J) an actuator element
(1) mounted for movement between first and second positions and
(2) arranged to be moved by said first motor member to its said second position in response to movement of said first motor member into its torque multiplying position; and
(K) means operative
(1) in response to movement of said actuator element to its said second position to move said valve member to its said first position and
(2) in response to movement of said actuator element to its said first position to move said valve member to its said second position.

6. A hydrostatic transmission of the split reaction type including:
(A) a casing;
(B) an input shaft;
(C) an output shaft;
(D) positive displacement pump means;
(E) a positive displacement motor including
(1) a first motor member journalled for rotation within said casing and drivingly connected to said output shaft, and
(2) a second motor member carried by said casing;
(F) valving means, including low pressure conduit means and high pressure conduit means, operative to establish fluid communication
(1) through said low pressure conduit means between the intake of said pump means and a source of low pressure fluid and
(2) through said high pressure conduit means between the output of said pump means and said motor;
(G) said pump means
(1) including (a) a first pump member fixed to said input shaft for rotation therewith and (b) a second pump member carried by said first motor member for rotation therewith and
(2) being operative in response to relative rotation of said first and second pump members to (a) draw low pressure fluid through said low pressure conduit means and (b) deliver high pressure fluid through said high pressure conduit means to the intake of said motor, whereby to drive the latter;
(H) means mounting said second motor member for movement relative to said casing and said first motor member between (1) a torque multiplying position in which the displacement of said motor is at a maximum value and (2) a locked-up position in which the displacement of said motor is substantially zero; and (I) an actuator element (1) mounted for movement between first and second positions and (2) lying when in its said first position in the path of movement of said first motor member so that it is engaged by the reaction member as the latter approaches its locked-up position and is thereafter moved to its second position as the reaction member moves into its locked-up position; and (J) means operative in response to movement of said actuator element into its said second position to block said high pressure conduit means and thereby isolate the motor from the high pressures generated in the pump means.

7. A hydrostatic transmission of the split reaction type including:

(A) a casing;
(B) an input shaft;
(C) an output shaft;
(D) positive displacement pump means;
(E) a positive displacement motor including (1) a first motor member journalled for rotation within said casing and drivingly connected to said output shaft, and (2) a second motor member carried by said casing;

(F) valving means, including low pressure conduit means and high pressure conduit means, operative to establish fluid communication (1) through said low pressure conduit means between the intake of said pump means and a source of low pressure fluid and (2) through said high pressure conduit means between the output of said pump means and said motor;

(G) said pump means (1) including (a) a first pump member fixed to said input shaft for rotation therewith and (b) a second pump member carried by said first motor member for rotation therewith and (2) being operative in response to relative rotation of said first and second pump members to (a) draw low pressure fluid through said low pressure conduit means and (b) deliver high pressure fluid through said high pressure conduit means to the intake of said motor, whereby to drive the latter;

(H) means mounting said second motor member for movement relative to said casing and said first motor member between (1) a torque multiplying position in which the displacement of said motor is at a maximum value and (2) a locked-up position in which the displacement of said motor is substantially zero; and (I) an actuator element having a first position in the path of movement of said first motor member;

(J) means mounting said actuator element for movement in the direction of movement of said first motor member as the latter moves toward its locked-up position, whereby said actuator element is engaged by said first motor member as the latter moves toward its locked-up position and thereafter moves with said first motor member in said direction;

(K) means limiting the movement of said actuator element in said direction, whereby to define a second position of said actuator element and define the locked-up position of said first motor member; and (L) means operative in response to movement of said actuator element into its said second position to block said high pressure conduit means and thereby isolate the motor from the high pressures generated in the pump means.

8. A hydrostatic transmission of the split reaction type including:

(A) a casing;
(B) an input shaft;
(C) an output shaft;
(D) positive displacement pump means;
(E) a positive displacement motor including (1) a first motor member journalled for rotation within said casing and drivingly connected to said output shaft, and (2) a second motor member carried by said casing;

(F) valving means, including low pressure conduit means and high pressure conduit means, operative to establish fluid communication (1) through said low pressure conduit means between the intake of said pump means and a source of low pressure fluid and (2) through said high pressure conduit means between the output of said pump means and said motor;

(G) said pump means (1) including (a) a first pump member fixed to said input shaft for rotation therewith and (b) a second pump member carried by said first motor member for rotation therewith and (2) being operative in response to relative rotation of said first and second pump members to (a) draw low pressure fluid through said low pressure conduit means and (b) deliver high pressure fluid through said high pressure conduit means to the intake of said motor, whereby to drive the latter;

(H) means mounting said second motor member for movement relative to said casing and said first motor member between (1) a torque multiplying position in which the displacement of said motor is at a maximum value and (2) a locked-up position in which the displacement of said motor is substantially zero; and (I) a source of control fluid (J) a first valve member mounted for movement between (1) a first position hydraulically blocking said high pressure conduit means and (2) a second position clear of said high pressure conduit means;

(K) a second valve member having a first position in the path of movement of said first motor member;

(L) means mounting said second valve member for movement in the direction of movement of said first motor member as the latter moves toward its locked-up position, whereby said second valve member is engaged by said first motor member as the latter moves toward its locked-up position and is thereafter moved by said first motor member to a second position as the first motor member moves into its locked-up position;

(M) means operative (1) with said second valve member in said first position to maintain the pressure of said control fluid below a predetermined value and (2) in response to movement of said second valve member to its said second position, to raise said control fluid pressure to said predetermined value; and (N) means operative (1) in response to control fluid pressure below said predetermined value to maintain said first valve member in its said second position and (2) in response to said predetermined control fluid pressure to move said first valve member to its said first position.

9. A hydrostatic transmission of the split reaction type including:
 (A) a casing;
 (B) an input shaft;
 (C) an output shaft;
 (D) positive displacement pump means;
 (E) a positive displacement motor including
  (1) a first motor member journalled for rotation within said casing and drivingly connected to said output shaft, and
  (2) a second motor member carried by said casing;
 (F) valving means, including low pressure conduit means and high pressure conduit means, operative to establish fluid communication
  (1) through said low pressure conduit means between the intake of said pump means and a source of low pressure fluid and
  (2) through said high pressure conduit means between the output of said pump means and said motor;
 (G) said pump means
  (1) including (a) a first pump member fixed to said input shaft for rotation therewith and (b) a second pump member carried by said first motor member for rotation therewith and
  (2) being operative in response to relative rotation of said first and second pump members to (a) draw low pressure fluid through said low pressure conduit means and (b) deliver high pressure fluid through said high pressure conduit means to the intake of said motor, whereby to drive the latter;
 (H) means mounting said second motor member for movement relative to said casing and said first motor member between
  (1) a torque multiplying position in which the displacement of said motor is at a maximum value and
  (2) a locked-up position in which the displacement of said motor is substantially zero; and
 (I) a source of control fluid
 (J) a first valve member mounted for movement between
  (1) a first position hydraulically blocking said high pressure conduit means, and
  (2) a second position clear of said high pressure conduit means;
 (K) a second valve member having a first position in the path of movement of said first motor member;
 (L) means mounting said second valve member for movement in the direction of movement of said first motor member as the latter moves toward its locked-up position, whereby said second valve member is engaged by said first motor member as the latter moves toward its locked-up position and thereafter moves with said first motor member in said direction;
 (M) means limiting the movement of said second valve member in said direction, whereby to define a second position of said second valve member and define the locked-up position of said first motor member;
 (N) means operative
  (1) with said second valve member in said first position to maintain the pressure of said control fluid below a predetermined value and
  (2) in response to movement of said second valve member to its said second position, to raise said control fluid pressure to said predetermined value; and
 (O) means operative
  (1) in response to control fluid pressure below said predetermined value to maintain said first valve member in its said second position and
  (2) in response to said predetermined control fluid pressure to move said first valve member to its said first position.

10. In a hydrostatic transmission of the split reaction type including
 (A) a primary and a secondary barrel each having a plurality of circumferentially spaced guide openings slidably receiving a plurality of pistons;
 (B) a primary reaction member carried on said secondary barrel and arranged to produce selective stroking of said primary pistons in response to rotation of said primary barrel relative to said secondary barrel;
 (C) a secondary reaction member, fixed against rotation, against which said secondary pistons bear;
 (D) valving means, including high pressure conduit means and low pressure conduit means, operative
  (a) during the intake stroke of each primary piston, to establish fluid communication through said low pressure conduit means between that primary piston and a source of low pressure fluid, and
  (b) during the pumping stroke of each primary piston, to establish fluid communication through said high pressure conduit means between that primary piston and a secondary piston; and
 (E) means mounting said secondary reaction member for movement between
  (a) a torque multiplying position in which the secondary pistons are free to stroke in response to receipt of pressurized fluid through said high pressure conduit means from said primary barrel, whereby to produce rotation of said secondary barrel, and
  (b) a locked-up position in which the secondary pistons remain substantially fixed relative to their bores as the secondary barrel rotates relative to said secondary reaction member:

the improvement wherein said transmission further includes
 (F) means operative to selectively block said high pressure conduit means and isolate the secondary barrel from the high pressures generated in said primary barrel.

11. In a hydrostatic transmission of the split reaction type including
 (A) a primary and a secondary barrel each having a plurality of circumferentially spaced bores slidably receiving a plurality of pistons;
 (B) a primary reaction member carried on said secondary barrel and arranged to produce selective stroking of said primary pistons in response to rotation of said primary barrel relative to said secondary barrel;
 (C) a secondary reaction member, fixed against rotation, against which said secondary pistons bear;
 (D) valving means, including high pressure conduit means and low pressure conduit means, operative
  (a) during the intake stroke of each primary piston, to establish fluid communication through said low pressure conduit means between that primary piston and a source of low pressure fluid, and
  (b) during the pumping stroke of each primary piston, to establish fluid communication through said high pressure conduit means between that primary piston and a secondary piston; and
 (E) means mounting said secondary reaction member for movement between
  (a) a torque multiplying position in which the secondary pistons are free to stroke in response to receipt of pressurized fluid through said high pressure conduit means from said primary barrel, whereby to produce rotation of said secondary barrel, and (b) a locked-up position in which the secondary pistons remain substantially fixed relative to their bores as the secondary barrel rotates relative to said secondary reaction member:

the improvement wherein said transmission further includes (F) means operative in response to movement of said secondary reaction member into its locked-up position to block said high pressure conduit means and thereby isolate the secondary barrel from the high pressures generated in said primary barrel.

12. In a hydrostatic transmission of the split reaction type including:

(A) a primary and a secondary barrel each having a plurality of circumferentially spaced bores slidably receiving a plurality of pistons;

(B) a primary reaction member carried on said secondary barrel and arranged to produce selective stroking of said primary pistons in response to rotation of said primary barrel relative to said secondary barrel;

(C) a secondary reaction member, fixed against rotation, against which said secondary pistons bear;

(D) valving means, including high pressure conduit means and low pressure conduit means, operative (a) during the intake stroke of each primary piston, to establish fluid communication through said low pressure conduit means between that primary piston and a source of low pressure fluid, and (b) during the pumping stroke of each primary piston, to establish fluid communication through said high pressure conduit means between that primary piston and a secondary piston, and (E) means mounting said secondary reaction member for movement between (a) a torque multiplying position in which the secondary pistons are free to stroke in response to receipt of pressurized fluid through said high pressure conduit means from said primary barrel, whereby to produce rotation of said secondary barrel, and (b) a locked-up position in which the secondary pistons remain substantially fixed relative to their bores as the secondary barrel rotates relative to said secondary reaction member:

the improvement wherein said transmission further includes (F) a valve member mounted for movement between (1) a first position hydraulically blocking said high pressure conduit means and (2) a second position clear of said high pressure conduit means; and (G) means operative (1) in response to movement of said secondary reaction member into its locked-up position to move said valve member to said first position and (2) in response to movement of said secondary reaction member out of said locked-up position to move said valve member to said second position.

13. In a hydrostatic transmission of the split reaction type including:

(A) a primary and a secondary barrel each having a plurality of circumferentially spaced bores slidably receiving a plurality of pistons;

(B) a primary reaction member carried on said secondary barrel and arranged to produce selective stroking of said primary pistons in response to rotation of said primary barrel relative to said secondary barrel;

(C) a secondary reaction member, fixed against rotation, against which said secondary pistons bear;

(D) valving means, including a high pressure conduit means and a low pressure conduit means, operative (a) during the intake stroke of each primary piston, to establish fluid communication through said low pressure conduit means between that primary piston and a source of low pressure fluid, and (b) during the pumping stroke of each primary piston, to establish fluid communication through said high pressure conduit means between that primary piston and a secondary piston; and (E) means mounting said secondary reaction member for movement between (a) a torque multiplying position in which the secondary pistons are free to stroke in response to receipt of pressurized fluid through said high pressure conduit means from said primary barrel, whereby to produce rotation of said secondary barrel, and (b) a lock-up position in which the secondary pistons remain substantially fixed relative to their bores as the secondary barrel rotates relative to said secondary reaction member:

the improvement wherein said transmisison further includes (F) a source of control fluid;

(G) a valve member movable (1) in response to a predetermined control fluid pressure, into a first position hydraulically blocking said high pressure conduit means and (2) in response to a control fluid pressure below said predetermined value, into a second position clear of said high pressure conduit; and (H) means operative (1) in response to movement of said secondary reaction member into its locked-up position to raise said control fluid pressure to said predetermined value and (2) in response to movement of said secondary reaction member out of said lock-up position to lower said control fluid pressure below said predetermined value.

14. In a hydrostatic transmission of the split reaction type including:

(A) a primary and a secondary barrel each having a plurality of circumferentially spaced bores slidably receiving a plurality of pistons;

(B) a primary reaction member carried on said secondary barrel and arranged to produce selective stroking of said primary pistons in response to rotation of said primary barrel relative to said secondary barrel;

(C) a secondary reaction member, fixed against rotation, against which said secondary pistons bear;

(D) valving means, including high pressure conduit means and low pressure conduit means, operative (a) during the intake stroke of each primary piston, to establish fluid communication through said low pressure conduit means between that primary piston and a source of low pressure fluid, and (b) during the pumping stroke of each primary piston, to establish fluid communication through said high pressure conduit means between that primary piston and a secondary piston; and (E) means mounting said secondary reaction member for movement between (a) a torque multiplying position in which the secondary pistons are free to stroke in response to receipt of pressurized fluid through said high pressure conduit means from said primary barrel, whereby to produce rotation of said secondary barrel, and
    (b) a locked-up position in which the secondary pistons remain substantially fixed relative to their bores as the secondary barrel rotates relative to said secondary reaction member:

the improvement wherein said transmission further includes (F) a source of control fluid;
  (G) a valve member mounted for movement between
    (1) a first position hydraulically blocking said high pressure conduit means and
    (2) a second position clear of said high pressure conduit means;
  (H) means operative
    (1) in response to pressure of said control fluid below a predetermined value to maintain said valve member in its said second position and
    (2) in response to said predetermined control fluid pressure to move said valve member to its said first position; and
  (I) means operative
    (1) with said secondary reaction member in its torque multiplying position to maintain said control fluid pressure below said predetermined value and
    (2) in response to movement of said secondary reaction member into its locked-up position to raise said control fluid pressure to said predetermined value.

15. In a hydrostatic transmission of the split reaction type including:
  (A) a primary and a secondary barrel each having a plurality of circumferentially spaced bores slidably receiving a plurality of pistons;
  (B) a primary reaction member carried on said secondary barrel and arranged to produce selective stroking of said primary pistons in response to rotation of said primary barrel relative to said secondary barrel;
  (C) a secondary reaction member, fixed against rotation, against which said secondary pistons bear;
  (D) valving means, including high pressure conduit means and low pressure conduit means, operative
    (a) during the intake stroke of each primary piston, to establish fluid communication through said low pressure conduit means between that primary piston and a source of low pressure fluid, and
    (b) during the pumping stroke of each primary piston, to establish fluid communication through said high pressure conduit means between that primary piston and a secondary piston; and
  (E) means mounting said secondary reaction member for movement between
    (a) a torque multiplying position in which the secondary pistons are free to stroke in response to receipt of pressurized fluid through said high pressure conduit means from said primary barrel, whereby to produce rotation of said secondary barrel, and
    (b) a locked-up position in which the secondary pistons remain substantially fixed relative to their bores as the secondary barrel rotates relative to said secondary reaction member:

the improvement wherein said transmission further includes (F) a valve member mounted for movement between
    (1) a first position hydraulically blocking said high pressure conduit means and
    (2) a second position clear of said high pressure conduit means;
  (G) an actuator element
    (1) mounted for movement between first and second positions and
    (2) arranged to be moved by said secondary reaction member to its said second position in response to movement of said secondary reaction member into its torque multiplying position; and
  (H) means operative
    (1) in response to movement of said actuator element to its said second position to move said valve member to its said first position and
    (2) in response to movement of said actuator element to its said first position to move said valve member to its said second position.

16. In a hydrostatic transmission of the split reaction type including:
  (A) a primary and a secondary barrel each having a plurality of circumferentially spaced bores slidably receiving a plurality of pistons;
  (B) a primary reaction member carried on said secondary barrel and arranged to produce selective stroking of said primary pistons in response to rotation of said primary barrel relative to said secondary barrel;
  (C) a secondary reaction member, fixed against rotation, against which said secondary pistons bear;
  (D) valving means, including high pressure conduit means and low pressure conduit means, operative
    (a) during the intake stroke of each primary piston, to establish fluid communication through said low pressure conduit means between that primary piston and a source of low pressure fluid, and
    (b) during the pumping stroke of each primary piston to establish fluid communication through said high pressure conduit means between that primary piston and a secondary piston; and
  (E) means mounting said secondary reaction member for movement between
    (a) a torque multiplying position in which the secondary pistons are free to stroke in response to receipt of pressurized fluid through said high pressure conduit means from said primary barrel, whereby to produce rotation of said secondary barrel, and
    (b) a locked-up position in which the secondary pistons remain substantially fixed relative to their bores as the secondary barrel rotates relative to said secondary reaction member:

the improvement wherein said transmission further includes (F) an actuator element
    (1) mounted for movement between first and second positions and
    (2) lying when in its said first position in the path of movement of said secondary reaction member so that it is engaged by the reaction member as the latter approaches its locked-up position and is thereafter moved to its second position as the reaction member moves into its locked-up position; and
  (G) means operative in response to movement of said actuator element into its said second position to block said high pressure conduit means and thereby isolate the secondary barrel from the high pressures generated in said primary barrel.

17. In a hydrostatic transmission of the split reaction type including:
  (A) a primary and a secondary barrel each having a plurality of circumferentially spaced bores slidably receiving a plurality of pistons;
  (B) a primary reaction member carried on said secondary barrel and arranged to product selective stroking of said primary pistons in response to rotation of said primary barrel relative to said secondary barrel;

(C) a secondary reaction member, fixed against rotation, against which said secondary pistons bear;

(D) valving means, including a high pressure conduit means and a low pressure conduit means, operative
 (a) during the intake stroke of each primary piston, to establish fluid communication through said low pressure conduit means between that primary piston and a source of low pressure fluid, and
 (b) during the pumping stroke of each primary piston, to establish fluid communication through said high pressure conduit means between that primary piston and a secondary piston; and (E) means mounting said secondary reaction member for movement between
 (a) a torque multiplying position in which the secondary pistons are free to stroke in response to receipt of pressurized fluid through said high pressure conduit means from said primary barrel, whereby to produce rotation of said secondary barrel, and
 (b) a locked-up position in which the secondary pistons remain substantially fixed relative to their bores as the secondary barrel rotates relative to said secondary reaction member:

the improvement wherein said transmission further includes (F) an actuator element having a first position in the path of movement of said secondary reaction member;

(G) means mounting said actuator element for movement in the direction of movement of said secondary reaction member as the latter moves toward its locked up position, whereby said actuator element is engaged by said secondary reaction member as the latter moves toward its locked-up position and thereafter moves with said reaction member in said direction;

(H) means limiting the movement of said actuator element in said direction, whereby to define a second position of said actuator element and define the locked-up position of said secondary reaction member; and (I) means operative in response to movement of said actuator element into its said second position to block said high pressure conduit means and thereby isolate the secondary barrel from the high pressures generated in said primary barrel.

18. In a hydrostatic transmission of the split reaction type including:

(A) a primary and a secondary barrel each having a plurality of circumferentially spaced bores slidably receiving a plurality of pistons;

(B) a primary reaction member carried on said secondary barrel and arranged to produce selective stroking of said primary pistons in response to rotation of said primary barrel relative to said secondary barrel;

(C) a secondary reaction member, fixed against rotation, against which said secondary pistons bear;

(D) valving means, including high pressure conduit means and low pressure conduit means, operative
 (a) during the intake stroke of each primary piston, to establish fluid communication through said low pressure conduit means between that primary piston and a source of low pressure fluid, and
 (b) during the pumping stroke of each primary piston, to establish fluid communication through said high pressure conduit means between that primary piston and a secondary piston; and (E) means mounting said secondary reaction member for movement between
 (a) a torque multiplying position in which the secondary pistons are free to stroke in response to receipt of pressurized fluid through said high pressure conduit means from said primary barrel, whereby to produce rotation of said secondary barrel, and
 (b) a locked-up position in which the secondary pistons remain substantially fixed relative to their bores as the secondary barrel rotates relative to said secondary reaction member:

the improvement wherein said transmission further includes (F) a source of control fluid;

(G) a first valve member mounted for movement between
 (1) a first position hydraulically blocking said high pressure conduit means and
 (2) a second position clear of said high pressure conduit means;

(H) a second valve member having a first position in the path of movement of said secondary reaction member;

(I) means mounting said second valve member for movement in the direction of movement of said secondary reaction member as the latter moves toward its locked-up position, whereby said second valve member is engaged by said secondary reaction member as the latter moves toward its locked-up position and is thereafter moved by said reaction member to a second position as the reaction member moves into its locked-up position;

(J) means operative
 (1) with said second valve member in said first position to maintain the pressure of said control fluid below a predetermined value and
 (2) in response to movement of said second valve member to its said second position, to raise said control fluid pressure to said predetermined value; and (K) means operative
 (1) in response to control fluid pressure below said predetermined value to maintain said first valve member in its said second position and
 (2) in response to said predetermined control fluid pressure to move said first valve member to its said first position.

19. In a hydrostatic transmission of the split reaction type including:

(A) a primary and a secondary barrel each having a plurality of circumferentially spaced bores slidably receiving a plurality of pistons;

(B) a primary reaction member carried on said secondary barrel and arranged to produce selective stroking of said primary pistons in response to rotation of said primary barrel relative to said secondary barrel;

(C) a secondary reaction member, fixed against rotation, against which said secondary pistons bear;

(D) valving means, including high pressure conduit means and low pressure conduit means, operative
 (a) during the intake stroke of each primary piston, to establish fluid communication through said low pressure conduit means between that primary piston and a source of low pressure fluid, and
 (b) during the pumping stroke of each primary piston, to establish fluid communication through said high pressure conduit means between that primary piston and a secondary piston, and (E) means mounting said secondary reaction member for movement between
 (a) a torque multiplying position in which the secondary pistons are free to stroke in response to receipt of pressurized fluid through said high pressure conduit means from said primary barrel, whereby to produce rotation of said secondary barrel, and
   (b) a locked-up position in which the secondary pistons remain substantially fixed relative to their bores as the secondary barrel rotates relative to said secondary reaction member:
the improvement wherein said transmission further includes
(F) a source of control fluid
(G) a first valve member mounted for movement between
   (1) a first position hydraulically blocking said high pressure conduit means and
   (2) a second position clear of said high pressure conduit means;
(H) a second valve member having a first position in the path of movement of said secondary reaction member;
(I) means mounting said second valve member for movement in the direction of movement of said secondary reaction member as the latter moves toward its locked-up position, whereby said second valve member is engaged by said secondary reaction member as the latter moves toward its locked-up position and thereafter moves with said reaction member in said direction;
(J) means limiting the movement of said second valve member in said direction, whereby to define a second position of said second valve member and define the locked-up position of said secondary reaction member;
(K) means operative
   (1) with said second valve member in said first position to maintain the pressure of said control fluid below a predetermined value and
   (2) in response to movement of said second valve member to its said second position, to raise said control fluid pressure to said predetermined value; and
(L) means operative
   (1) in response to control fluid pressure below said predetermined value to maintain said first valve member in its said second position and
   (2) in response to said predetermined control fluid pressure to move said first valve member to its said first position.

20. A hydrostatic transmission comprising
(A) an input shaft;
(B) a primary barrel
   (1) secured to said input shaft for rotation therewith and
   (2) having a plurality of circumferentially spaced bores
(C) a secondary barrel
   (1) mounted for rotation about a fixed axis and
   (2) having a plurality of circumferentially spaced bores;
(D) means defining a primary reaction surface on said secondary barrel extending around said shaft axis to successively intersect the longitudinal axes of said primary bores at locations therealong progessively varying in distance, with each succeeding axis, from a reference circle which passes through said primary bore axes and is concentric with, and lies in a plane normal to, said shaft axis;
(E) a plurality of primary pistons slidably received within said primary bores and bearing at their outer ends against said primary reaction surface whereby upon rotation of said primary barrel relative to said second barrel said pistons are caused to selectively reciprocate in their respective bores;
(F) a secondary reaction member fixed against rotation and defining a continuous secondary reaction surface extending around the rotational axis of said secondary barrel;
(G) means mounting said secondary reaction member for movement between
   (1) a torque multiplying position in which said second reaction surface successively intersects the longitudinal axes of said secondary bores at locations therealong progressively varying in distance, with each succeeding axes, from a secondary reference circle which passes through said secondary bore axes and is concentric with, and lies in a plane normal to, said secondary barrel axis, and
   (2) a locked-up position in which said secondary reaction surface successively intersects the longitudinal axes of said secondary bores at locations thereon at a uniform distance from said secondary reference circle;
(H) a plurality of secondary pistons slidably received within said secondary bores and bearing at their outer ends against said secondary reaction surface;
(I) valving means, including high pressure conduit means and low pressure conduit means, operative
   (a) during the intake stroke of each primary piston, to establish fluid communication through said low pressure conduit means between that primary piston and a source of low pressure fluid, and
   (b) during the pumping stroke of each primary piston, to establish fluid communication through said high pressure conduit means between that primary piston and a secondary piston; and
(J) means operative in response to movement of said secondary reaction member into its locked-up position to block said high pressure conduit means and thereby isolate the secondary barrel from the high pressures generated in said primary barrel.

21. A hydrostatic transmission of the split reaction type including:
(A) a secondary barrel including a hollow cylindrical shell portion mounted for rotation about a central longitudinal axis and having a plurality of circumferentially spaced axial bores;
(B) a secondary swash plate coaxial with said shell portion and spaced from one end of the latter;
(C) a plurality of secondary pistons slidably received in said secondary bores and projecting from said bores at said one end of said shell portion to bear against said secondary swash plates;
(D) a primary swash plate fixed within said secondary barrel adjacent said one end of said shell portion;
(E) a housing member fixed to said secondary barrel adjacent the other end of said shell portion to close that end and having a central axial bore concentric with said central axis;
(F) a primary barrel disposed concentrically within said shell portion between said primary swash plate and said housing member and having a plurality of circumferentially spaced axial bores slidably receiving a plurality of pistons projecting from said bores to bear against said primary swash plate;
(G) an input shaft mounted for rotation on said central axis and extending through said secondary and primary swash plates for securement to said primary barrel, whereby rotation of said input shaft produces reciprocation of said primary pistons;
(H) valving means, including low pressure conduit means and high pressure conduit means defined in part by at least a portion of said central bore in said housing member, operative
   (a) during the intake stroke of each primary piston, to establish fluid communication through said low pressure conduit means between that primary piston and a source of low pressure fluid, and (b) during the pumping stroke of each primary piston to establish fluid communication through said high pressure conduit means between that primary piston and a secondary piston;
(I) means mounting said secondary swash plate for movement between
  (a) a torque multiplying position at an acute angle to said central axis and
  (b) a locked-up position at a right angle to said central axis;
(J) a valve member for coaction with said central bore of said housing member and mounted for movement between
  (a) a first position hydraulically blocking said portion of said central bore and
  (b) a second position clear of said bore portion; and
(K) means operative
  (1) in response to movement of said secondary swash plate into its locked-up position to move said valve member to its said first position and
  (2) in response to movement of said secondary swash plate out of said locked-up position to move said valve member to said second position.

22. A hydrostatic transmission of the split reaction type including:
(A) a secondary barrel including a hollow cylindrical shell portion mounted for rotation about a central longitudinal axis and having a plurality of circumferentially spaced axial bores;
(B) a secondary swash plate coaxial with said shell portion and spaced from one end of the latter;
(C) a plurality of secondary pistons slidably received in said secondary bores and projecting from said bores at said one end of said shell portion to bear against said secondary swash plate;
(D) a primary swash plate fixed within said secondary barrel adjacent said one end of said shell portions;
(E) a housing member fixed to said secondary barrel adjacent the other end of said shell portion to close that end and having a central axial bore concentric with said central axis;
(F) a primary barrel disposed concentrically within said shell portion between said primary swash plate and said housing member and having a plurality of circumferentially spaced axial bores slidably receiving a plurality of pistons projecting from said bores to bear against said primary swash plate;
(G) an input shaft mounted for rotation on said central axis and extending through said secondary and primary swash plates for securement to said primary barrel, whereby rotation of said input shaft produces reciprocation of said primary pistons;
(H) valving means, including low pressure conduit means and high pressure conduit means defined in part by at least a portion of said central bore in said housing member, operative
  (a) during the intake stroke of each primary piston, to establish fluid communication through said low pressure conduit means between that primary piston and a source of low pressure fluid, and
  (b) during the pumping stroke of each primary piston to establish fluid communication through said high pressure conduit means between that primary piston and a secondary piston;
(I) means mounting said secondary swash plate for movement between
  (a) a torque multiplying position at an acute angle to said central axis and
  (b) a locked-up position at a right angle to said central axis;
(J) a source of control fluid;
(K) a valve member movable
  (1) in response to a predetermined control fluid pressure, into a first position htydraulically blocking said portion of said central bore of said housing member and
  (2) in response to a control fluid pressure below said predetermined value, into a second position clear of said central bore portion; and
(L) means operative
  (1) in response to movement of said secondary swash plate into its locked-up position to raise said control fluid pressure to said predetermined value and
  (2) in response to movement of said secondary swash plate out of said locked-up position to lower said control fluid pressure below said predetermined value.

23. A hydrostatic transmission of the split reaction type including:
(A) a secondary barrel including a hollow cylindrical shell portion mounted for rotation about a central longitudinal axis and having a plurality of circumferentially spaced axial bores;
(B) a secondary swash plate coaxial with said shell portion and spaced from one end of the latter;
(C) a plurality of secondary pistons slidably received in said secondary bores and projecting from said bores at said one end of said shell portion to bear against said secondary swash plate;
(D) a primary swash plate fixed within said secondary barrel adjacent said one end of said shell portion;
(E) a housing member fixed to said secondary barrel adjacent the other end of said shell portion to close that end and having a central axial bore concentric with said central axis;
(F) a primary barrel disposed concentrically within said shell portion between said primary swash plate and said housing member and having a plurality of circumferentially spaced axial bores slidably receiving a plurality of pistons projecting from said bores to bear against said primary swash plate;
(G) an input shaft mounted for rotation on said central axis and extending through said secondary and primary swash plates for securement to said primary barrel, whereby rotation of said input shaft produces reciprocation of said primary pistons;
(H) valving means, including low pressure conduit means and high pressure conduit means defined in part by at least a portion of said central bore in said housing member, operative
  (a) during the intake stroke of each primary piston, to establish fluid communication through said low pressure conduit means between that primary piston and a source of low pressure fluid, and
  (b) during the pumping stroke of each primary piston to establish fluid communication through said high pressure conduit means between that primary piston and a secondary piston;
(I) means mounting said secondary swash plate movement between
  (a) a torque multiplying position at an acute angle to said central axis and
  (b) a locked-up position at a right angle to central axis;
(J) a source of control fluid
(K) a valve member for coaction with said central bore of said housing member and mounted for movement between
  (a) a first position hydraulically blocking said portion of said central bore and
  (b) a second position clear of said bore portion; and
(L) a second valve member having a first position in the path of movement of said secondary swash plate;

(M) means mounting said second valve member for movement in the direction of movement of said secondary swash plate as the latter moves toward its locked-up position, whereby said second valve member is engaged by said secondary swash plate as the latter moves toward its licked-up position and is thereafter moved by said swash plate to a second position as the swash plate moves into its locked-up position;

(N) means operative
    (1) with said second valve member in said first position to maintain the pressure of said control fluid below a predetermined value and
    (2) in response to movement of said second valve member to its said second position, to raise said control fluid pressure to said predetermined value, and (O) means operative
    (1) in response to control fluid pressure below said predetermined value to maintain said first valve member in its said second position and
    (2) in response to said predetermined control fluid pressure to move said first valve member to its said first position.

24. A hydrostatic transmission of the split reaction type including:

(A) a secondary barrel including a hollow cylindrical shell portion mounted for rotation about a central longitudinal axis and having a plurality of circumferentially spaced axial bores;

(B) a secondary swash plate coaxial with said shell portion and spaced from one end of the latter;

(C) a plurality of secondary pistons slidably received in said secondary bores and projecting from said bores at said one end of said shell portion to bear against said secondary swash plate;

(D) a primary swash plate fixed within said secondary barrel adjacent said one end of said shell portion;

(E) a housing member fixed to said secondary barrel adjacent the other end of said shell portion to close that end and having a central axial bore concentric with said central axis;

(F) a primary barrel disposed concentrically within said shell portion between said primary swash plate and said housing member and having a plurality of circumferentially spaced axial bores slidably receiving a plurality of pistons projecting from said bores to bear against said primary swash plate;

(G) an input shaft mounted for rotation on said central axis and extending through said secondary and primary swash plates for securement to said primary barrel, whereby rotation of said input shaft produces reciprocation of said primary pistons;

(H) valving means, including low pressure conduit means and high pressure conduit means defined in part by at least a portion of said central bore in said housing member, operative (a) during the intake stroke of each primary piston, to establish fluid communication through said low pressure conduit means between that primary piston and a source of low pressure fluid, and
    (b) during the pumping stroke of each primary piston, to establish fluid communication through said high pressure conduit means between that primary piston and a secondary piston;

(I) means mounting said secondary swash plate for movement between
    (a) a torque multiplying position at an acute angle to said central axis and
    (b) a locked-up position at a right angle to central axis;

(J) a source of control fluid;

(K) a valve member for coaction with said central bore of said housing member and mounted for movement between
    (a) a first position hydraulically blocking said portion of said central bore and
    (b) a second position clear of said bore portion;

(L) a second valve member having a first position in the path of movement of said secondary swash plate;

(M) means mounting said second valve member for movement in the direction of movement of said secondary swash plate as the latter moves toward its locked-up position, whereby said second valve member is engaged by said secondary swash plate as the latter moves toward its locked-up position and thereafter moves with said reaction member in said direction;

(N) means limiting the movement of said second valve member in said direction, whereby to define a second position of said second valve member and define the locked-up position of said secondary swash plate;

(O) means operative
    (1) with said second valve member in said first position to maintain the pressure of said control fluid below a predetermined value and (P) means operative
    (1) in response to control fluid pressure below said predetermined value to maintain said first valve member in its said second position and
    (2) in response to said predetermined control fluid pressure to move said first valve member to its said first position.

References Cited

UNITED STATES PATENTS

| | | | |
|---|---|---|---|
| 1,297,734 | 3/1919 | Rayburn et al. | 60—53 |
| 1,840,865 | 1/1932 | Rayburn et al. | 60—53 |
| 2,777,286 | 1/1957 | Badalini | 60—53 |
| 3,161,023 | 12/1964 | Margolin et al. | 60—53 |

EDGAR W. GEOGHEGAN, *Primary Examiner.*